(12) United States Patent
Chen et al.

(10) Patent No.: US 11,372,204 B2
(45) Date of Patent: Jun. 28, 2022

(54) IMAGING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Hung-Shuo Chen, Taichung (TW); Syuan Ruei Lai, Taichung (TW); Kuo-Jui Wang, Taichung (TW); Po-Lun Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 452 days.

(21) Appl. No.: 16/413,200

(22) Filed: May 15, 2019

(65) Prior Publication Data
US 2020/0285027 A1 Sep. 10, 2020

(30) Foreign Application Priority Data
Mar. 6, 2019 (TW) .................................. 108107433

(51) Int. Cl.
| G02B 9/62 | (2006.01) |
| H04N 5/225 | (2006.01) |
| G02B 7/02 | (2021.01) |

(52) U.S. Cl.
CPC ............... *G02B 9/62* (2013.01); *G02B 7/021* (2013.01); *H04N 5/2254* (2013.01)

(58) Field of Classification Search
None
See application file for complete search history.

(56) References Cited

U.S. PATENT DOCUMENTS

| 9,857,563 | B2 | 1/2018 | Liao et al. | |
|---|---|---|---|---|
| 10,031,318 | B2 | 7/2018 | Chen et al. | |
| 2014/0327808 | A1* | 11/2014 | Chen | G02B 27/0025 348/335 |
| 2015/0198786 | A1* | 7/2015 | Liao | G02B 13/0045 359/713 |
| 2015/0370042 | A1* | 12/2015 | Chen | G02B 13/0045 359/713 |
| 2016/0004040 | A1* | 1/2016 | Chen | G02B 13/0045 359/713 |
| 2016/0320592 | A1* | 11/2016 | Huang | G02B 9/62 |

(Continued)

FOREIGN PATENT DOCUMENTS

| CN | 108363163 A | 8/2018 |
|---|---|---|
| CN | 108469668 A | 8/2018 |

(Continued)

OTHER PUBLICATIONS

IN Office Action in Application No. 201934025079 dated Aug. 31, 2021.

*Primary Examiner* — Christopher Stanford
*Assistant Examiner* — Journey F Sumlar
(74) *Attorney, Agent, or Firm* — Maschoff Brennan

(57) ABSTRACT

An imaging optical lens assembly includes six lens elements which are, in order from an object side to an image side: a first lens element, a second lens element, a third lens element, a fourth lens element, a fifth lens element and a sixth lens element. The first lens element with positive refractive power has an object-side surface being convex in a paraxial region thereof.

30 Claims, 27 Drawing Sheets

(56) References Cited

U.S. PATENT DOCUMENTS

| | | | | |
|---|---|---|---|---|
| 2017/0017064 A1* | 1/2017 | Jo | ............... | G02B 13/0045 |
| 2017/0299846 A1* | 10/2017 | Lin | ............... | G02B 13/0045 |
| 2017/0336604 A1* | 11/2017 | Hsu | ............... | G02B 9/62 |
| 2018/0074297 A1* | 3/2018 | Lee | ............... | G02B 13/0045 |
| 2018/0188505 A1 | 7/2018 | Chang et al. | | |
| 2018/0188506 A1 | 7/2018 | Chang et al. | | |

FOREIGN PATENT DOCUMENTS

| | | |
|---|---|---|
| CN | 108627955 A | 10/2018 |
| CN | 108732721 A | 11/2018 |
| CN | 109164560 A | 1/2019 |
| JP | 2001033691 A | 2/2001 |
| TW | I629531 B | 7/2018 |

\* cited by examiner

US 11,372,204 B2

IMAGING OPTICAL LENS ASSEMBLY, IMAGE CAPTURING UNIT AND ELECTRONIC DEVICE

RELATED APPLICATIONS

This application claims priority to Taiwan Application 108107433, filed on Mar. 6, 2019, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens assembly includes six lens elements. The six lens elements are, in order from an object side to an image side, a first lens element, a second lens element, a third lens element, a fourth lens element, a fifth lens element and a sixth lens element. The first lens element with positive refractive power has an object-side surface being convex in a paraxial region thereof.

When a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, an axial distance between the third lens element and the fourth lens element is T34, an axial distance between the fourth lens element and the fifth lens element is T45, an axial distance between the object-side surface of the first lens element and an image-side surface of the sixth lens element is TD, an axial distance between the image-side surface of the sixth lens element and an image surface is BL, a focal length of the imaging optical lens assembly is f, and a curvature radius of the image-side surface of the sixth lens element is R12, the following conditions are satisfied:

$1.0 \leq CT1/(CT2+CT3+CT4+CT5)$;

$0.80 < T23/T34$;

$1.20 < T23/T45$;

$1.20 < TD/BL < 50$; and $f/R12 \leq 0$.

According to another aspect of the present disclosure, an imaging optical lens assembly includes six lens elements. The six lens elements are, in order from an object side to an image side, a first lens element, a second lens element, a third lens element, a fourth lens element, a fifth lens element and a sixth lens element. The first lens element with positive refractive power has an object-side surface being convex in a paraxial region thereof.

When a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, an axial distance between the third lens element and the fourth lens element is T34, an axial distance between the fourth lens element and the fifth lens element is T45, an axial distance between the object-side surface of the first lens element and an image-side surface of the sixth lens element is TD, an axial distance between the image-side surface of the sixth lens element and an image surface is BL, a focal length of the imaging optical lens assembly is f, and a curvature radius of the image-side surface of the sixth lens element is R12, the following conditions are satisfied:

$0.70 < CT1/(CT2+CT3+CT4+CT5)$;

$1.20 < T23/(T34+T45) < 20$;

$3.0 < TD/BL < 50$; and $f/R12 \leq 0$.

According to another aspect of the present disclosure, an image capturing unit includes one of the aforementioned imaging optical lens assemblies and an image sensor, wherein the image sensor is disposed on the image surface of the imaging optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens assembly includes six lens elements. The six lens elements are, in order from an object side to an image side, a first lens element, a second lens element, a third lens element, a fourth lens element, a fifth lens element and a sixth lens element.

The first lens element with positive refractive power has an object-side surface being convex in a paraxial region thereof. Therefore, it is favorable for providing significant light converging capability so as to miniaturize the imaging optical lens assembly.

The fifth lens element can have an object-side surface being concave. Therefore, it is favorable for correcting high-order aberrations so as to improve image quality.

Figure 27:
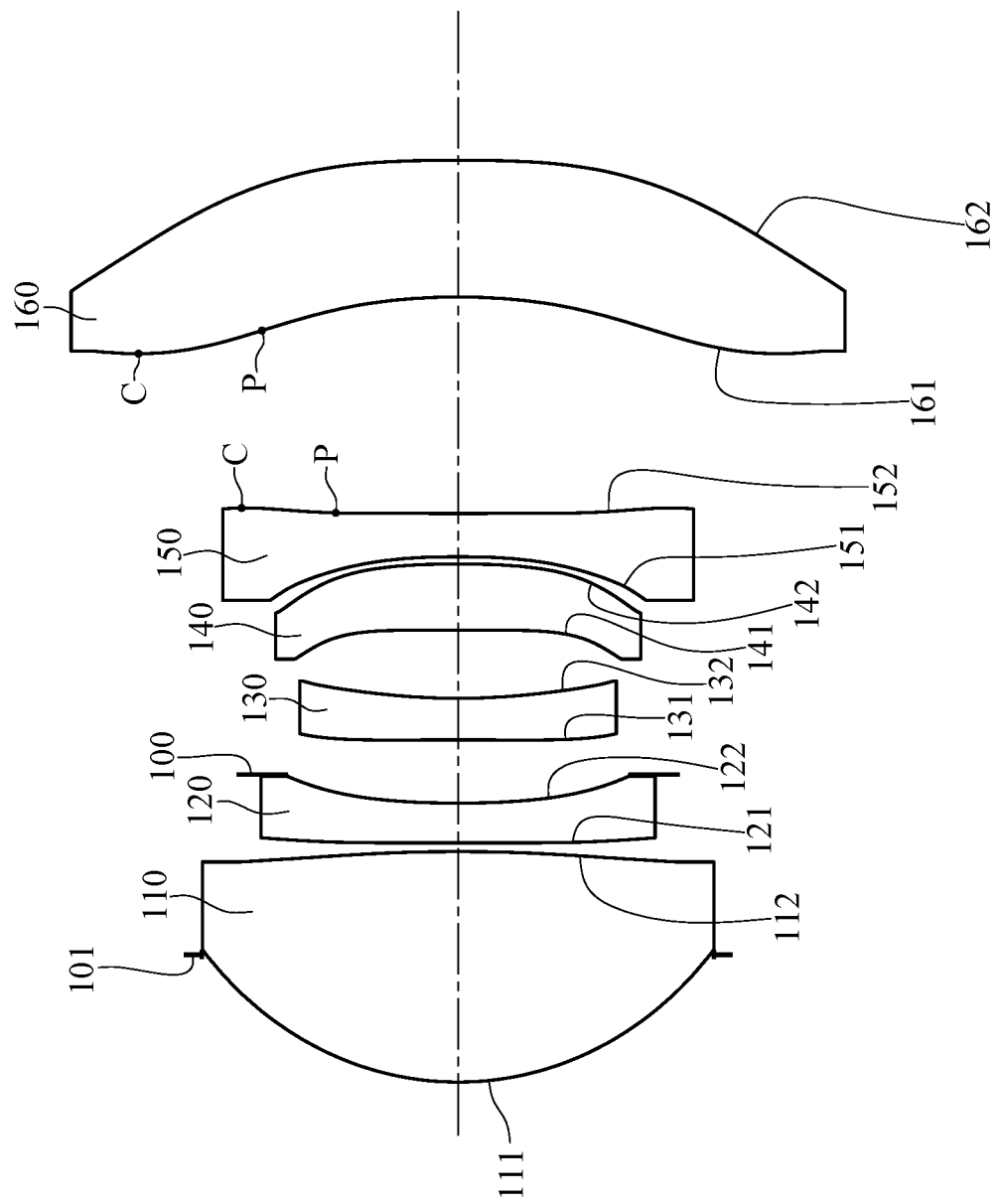
FIG. 27 shows a schematic view of inflection points and critical points of the fifth and sixth lens elements according to the 1st embodiment of the present disclosure.

According to the present disclosure, at least one of the fifth lens element and the sixth lens element can have at least one lens surface having at least one inflection point. Therefore, it is favorable for correcting the peripheral image. Moreover, at least one of the fifth lens element and the sixth lens element can have at least one lens surface having at least one critical point in an off-axis region thereof. Please refer to FIG. 27, which shows a schematic view of inflection points P and critical points C of the fifth lens element 150 and the sixth lens element 160 according to the 1st embodiment of the present disclosure. The inflection points P and critical points C on the image-side surface of the fifth lens element and the object-side surface of the sixth lens element in FIG. 27 are only exemplary. The other lens surfaces of the six lens elements may also have one or more inflection points and critical points.

When a central thickness of the first lens element is CT1, a central thickness of the second lens element is CT2, a central thickness of the third lens element is CT3, a central thickness of the fourth lens element is CT4, and a central thickness of the fifth lens element is CT5, the following condition is satisfied: $0.70<CT1/(CT2+CT3+CT4+CT5)$. Therefore, the arrangement of the second through fifth lens elements is favorable for gathering peripheral light and correcting off-axis aberrations, thereby improving image quality. Moreover, the following condition can also be satisfied: $1.0 \leq CT1/(CT2+CT3+CT4+CT5)$. Moreover, the following condition can also be satisfied: $0.85 \leq CT1/(CT2+CT3+CT4+CT5)<5.0$. Moreover, the following condition can also be satisfied: $1.10<CT1/(CT2+CT3+CT4+CT5)<3.0$. Moreover, the following condition can also be satisfied: $1.20<CT1/(CT2+CT3+CT4+CT5)<2.50$.

When an axial distance between the second lens element and the third lens element is T23, an axial distance between the third lens element and the fourth lens element is T34, and an axial distance between the fourth lens element and the fifth lens element is T45, at least one of the following conditions can be satisfied: $0.80<T23/T34$; and $1.20<T23/T45$. Therefore, it is favorable for providing a sufficient distance between adjacent lens elements in the middle part of the imaging optical lens assembly so as to arrange the second through fifth lens elements properly, and such lens configuration is favorable for focusing peripheral light and correcting off-axis aberrations. Moreover, the following condition can also be satisfied: $2.0<T23/T45$.

When an axial distance between the object-side surface of the first lens element and an image-side surface of the sixth lens element is TD, and an axial distance between the image-side surface of the sixth lens element and an image surface is BL, the following condition is satisfied: $1.20<TD/BL<50$. Therefore, it is favorable for miniaturizing the imaging optical lens assembly so as to make the imaging optical lens assembly applicable to various electronic devices. Moreover, the following condition can also be satisfied: $3.0<TD/BL<50$. Moreover, the following condition can also be satisfied: $2.0<TD/BL<20$.

When a focal length of the imaging optical lens assembly is f, and a curvature radius of the image-side surface of the sixth lens element is R12, the following condition is satisfied: $f/R12 \leq 0$. Therefore, it is favorable for ensuring a lens element on the image side with a larger effective radius and a sufficient thickness so as to increase the manufacturing feasibility. Moreover, the following condition can also be satisfied: $f/R12<-0.90$. Moreover, the following condition can also be satisfied: $-3.0<f/R12<-1.20$.

When the axial distance between the second lens element and the third lens element is T23, the axial distance between the third lens element and the fourth lens element is T34, and the axial distance between the fourth lens element and the fifth lens element is T45, the following condition can be satisfied: $1.20<T23/(T34+T45)<20$. Therefore, it is favorable for further correcting peripheral light and off-axis aberrations among the second through fifth lens elements.

When an Abbe number of the second lens element is V2, an Abbe number of the third lens element is V3, and an Abbe number of the fourth lens element is V4, the following condition can be satisfied: $V2+V3+V4<80$. Therefore, it is favorable for correcting chromatic aberration without excessive corrections. Moreover, the following condition can also be satisfied: $30<V2+V3+V4<70$.

When the central thickness of the first lens element is CT1, and a central thickness of the sixth lens element is CT6, the following condition can be satisfied: $CT1/CT6<2.0$. Therefore, it is favorable for ensuring a larger effective radius and a sufficient thickness of a lens element on the image side so as to increase the manufacturing feasibility. Moreover, the following condition can also be satisfied: $0.50<CT1/CT6<2.0$.

When a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following conditions can be satisfied: $|f1/f2|<1.0$; $|f1/f3|<1.0$; $|f1/f4|<1.0$; $|f1/f5|<1.0$; and $|f1/f6|<1.0$. Therefore, it is favorable for providing sufficient refractive power of the first lens element so as to gather light in the imaging optical lens assembly and reduce the effective radius of the lens elements, thereby reducing the size of the imaging optical lens assembly. Moreover, the following conditions can also be satisfied: $|f1/f2|<0.50$; $|f1/f3|<0.50$; $|f1/f4|<0.50$; $|f1/f5|<0.50$; and $|f1/f6|<0.50$. When a sum of axial distances between each of all adjacent lens elements of the imaging optical lens assembly is ΣAT, the axial distance between the second lens element and the third lens element is T23, and an axial distance between the fifth lens element and the sixth lens element is T56, the following condition can be satisfied: $\Sigma AT/(T23-T56)<2.0$. Therefore, it is favorable for providing a sufficient distance between adjacent lens elements in the middle part of the imaging optical lens assembly so as to arrange the second through fifth lens elements properly, and favorable for focusing peripheral light and correcting off-axis aberrations. Moreover, the following condition can also be satisfied: $\Sigma AT/(T23-T56)<1.75$. Moreover, the following condition can also be satisfied: $\Sigma AT/(T23-T56)<1.50$.

When the focal length of the second lens element is f2, and the focal length of the fifth lens element is f5, the following condition can be satisfied: $f5/f2<1.20$. Therefore, it is favorable for balancing the refractive power distribution of the imaging optical lens assembly so as to prevent excessive image corrections caused by an overly large refractive power variation on one side thereof. Moreover, the following condition can also be satisfied: $f5/f2<1.0$. Moreover, the following condition can also be satisfied: $f5/f2<0.80$.

When the number of lens elements having an Abbe number smaller than 32 in the imaging optical lens assembly is V32, the following condition can be satisfied: $3\leq V32$. Therefore, it is favorable for correcting chromatic aberration without excessive corrections. Moreover, the following condition can also be satisfied: $4\leq V32$.

When the number of lens elements having an Abbe number smaller than 24 in the imaging optical lens assembly is V24, the following condition can be satisfied: $3\leq V24$. Therefore, it is favorable for correcting chromatic aberration properly. Moreover, the following condition can also be satisfied: $4\leq V24$.

When an axial distance between the object-side surface of the first lens element and the image surface is TL, and the focal length of the imaging optical lens assembly is f, the following condition can be satisfied: $0.50<TL/f<1.05$. Therefore, it is favorable for obtaining a compact and telephoto configuration of the imaging optical lens assembly. Moreover, the following condition can also be satisfied: $0.60<TL/f<0.95$.

When the axial distance between the second lens element and the third lens element is T23, and the axial distance between the image-side surface of the sixth lens element and the image surface is BL, the following condition can be satisfied: $0.75<T23/BL$. Therefore, it is favorable for providing a sufficient distance between adjacent lens elements in the middle part of the imaging optical lens assembly so as to arrange the second through fifth lens elements properly, and favorable for focusing the peripheral light and correcting off-axis aberrations.

When the focal length of the second lens element is f2, and the focal length of the third lens element is f3, the following condition can be satisfied: $0.50<f2/f3<2.0$. Therefore, it is favorable for balancing the refractive power distribution of the lens elements so as to prevent insufficient or excessive corrections caused by overly strong refractive power on the object side or image side of the imaging optical lens assembly, thereby ensuring good image quality.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the imaging optical lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
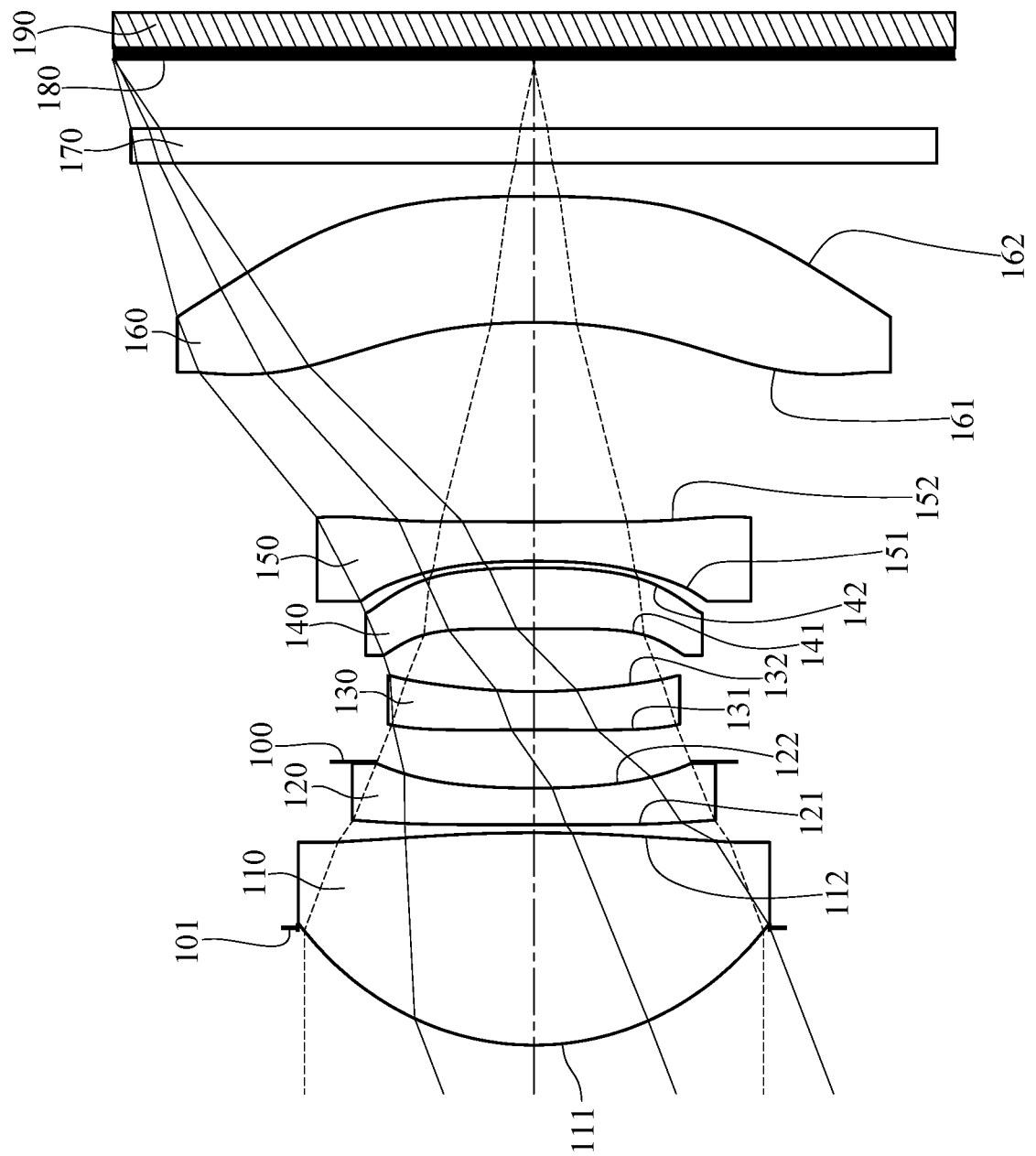
FIG. 1 is a schematic view of an image capturing unit according to the 1st embodiment of the present disclosure.
Figure 2:
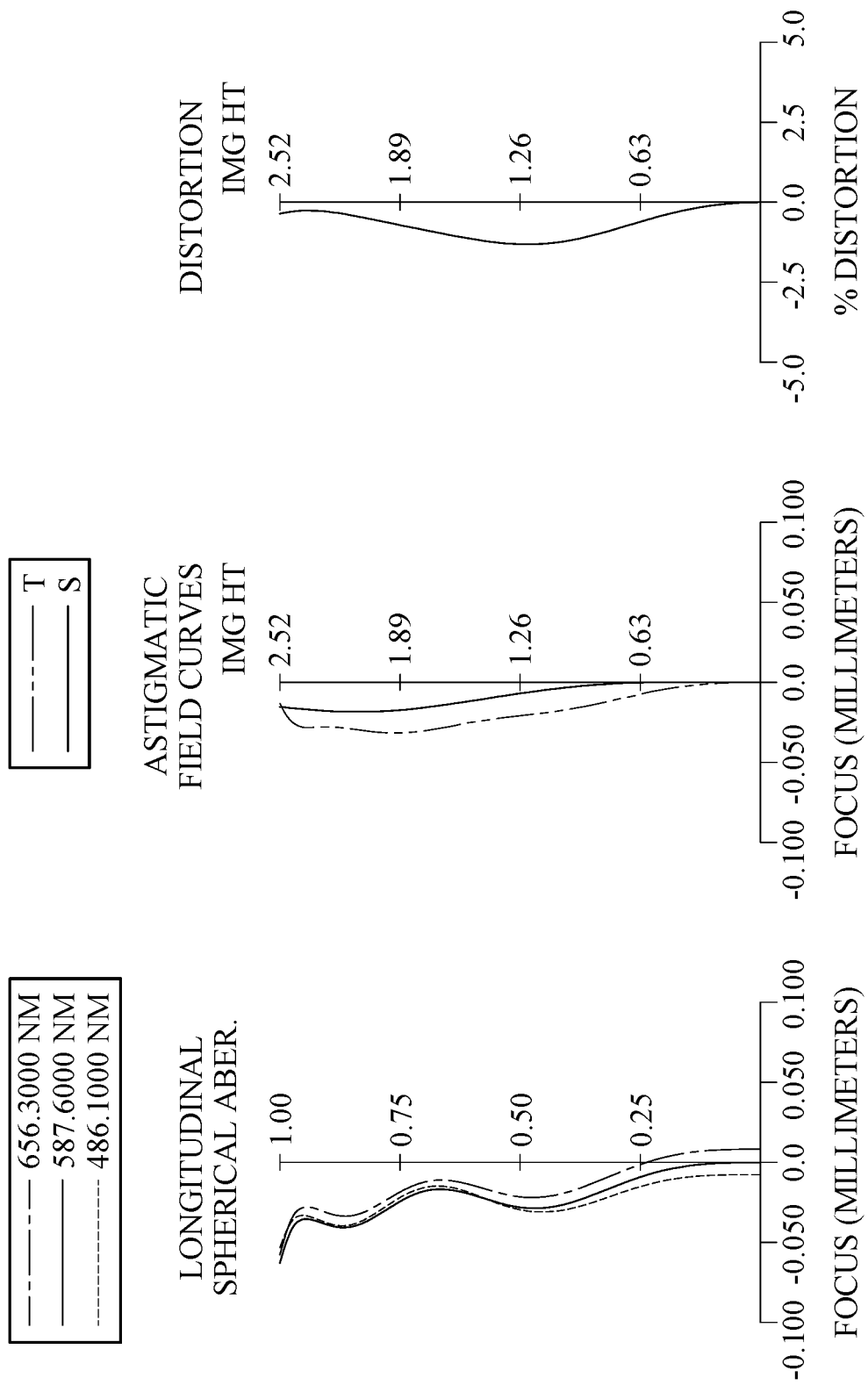
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 190. The imaging optical lens assembly includes, in order from an object side to an image side, a stop 101, a first lens element 110, a second lens element 120, an aperture stop 100, a third lens element 130, a fourth lens element 140, a fifth lens element 150, a sixth lens element 160, an IR-cut filter 170 and an image surface 180. The imaging optical lens assembly includes six lens elements (110, 120, 130, 140, 150 and 160) with no additional lens element disposed between each of the adjacent six lens elements.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one inflection point. The image-side surface 152 of the fifth lens element 150 has at least one critical point in an off-axis region thereof.

The sixth lens element 160 with negative refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has at least one inflection point. The object-side surface 161 of the sixth lens element 160 has at least one critical point in an off-axis region thereof.

The IR-cut filter 170 is made of glass material and located between the sixth lens element 160 and the image surface 180, and will not affect the focal length of the imaging optical lens assembly. The image sensor 190 is disposed on or near the image surface 180 of the imaging optical lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=6.63 millimeters (mm), Fno=2.40, HFOV=21.0 degrees (deg.).

When an Abbe number of the second lens element 120 is V2, an Abbe number of the third lens element 130 is V3, and an Abbe number of the fourth lens element 140 is V4, the following condition is satisfied: V2+V3+V4=62.4.

When the number of lens elements having an Abbe number smaller than 32 in the imaging optical lens assembly is V32, the following condition is satisfied: V32=3.

When the number of lens elements having an Abbe number smaller than 24 in the imaging optical lens assembly is V24, the following condition is satisfied: V24=3.

When a central thickness of the first lens element 110 is CT1, a central thickness of the second lens element 120 is CT2, a central thickness of the third lens element 130 is CT3, a central thickness of the fourth lens element 140 is CT4, and a central thickness of the fifth lens element 150 is CT5, the following condition is satisfied: CT1/(CT2+CT3+CT4+CT5)=1.21.

When the central thickness of the first lens element 110 is CT1, and a central thickness of the sixth lens element 160 is CT6, the following condition is satisfied: CT1/CT6=1.69.

When an axial distance between the second lens element 120 and the third lens element 130 is T23, and an axial distance between the third lens element 130 and the fourth lens element 140 is T34, the following condition is satisfied: T23/T34=0.93. In this embodiment, an axial distance between two adjacent lens elements is an air gap in a paraxial region between the two adjacent lens elements.

When the axial distance between the second lens element 120 and the third lens element 130 is T23, and an axial distance between the fourth lens element 140 and the fifth lens element 150 is T45, the following condition is satisfied: T23/T45=8.78.

When the axial distance between the second lens element 120 and the third lens element 130 is T23, the axial distance between the third lens element 130 and the fourth lens element 140 is T34, and the axial distance between the fourth lens element 140 and the fifth lens element 150 is T45, the following condition is satisfied: T23/(T34+T45)=0.84.

When the axial distance between the second lens element 120 and the third lens element 130 is T23, and an axial distance between the image-side surface 162 of the sixth lens element 160 and the image surface 180 is BL, the following condition is satisfied: T23/BL=0.43.

When a sum of axial distances between each of all adjacent lens elements of the imaging optical lens assembly is ΣAT, the axial distance between the second lens element 120 and the third lens element 130 is T23, and the axial distance between the fifth lens element 150 and the sixth lens element 160 is T56, the following condition is satisfied: ΣAT/(T23+T56)=1.30. In this embodiment, ΣAT is the sum of an axial distance between the first lens element 110 and the second lens element 120, the axial distance between the second lens element 120 and the third lens element 130, the axial distance between the third lens element 130 and the fourth lens element 140, the axial distance between the fourth lens element 140 and the fifth lens element 150, and the axial distance between the fifth lens element 150 and the sixth lens element 160.

When an axial distance between the object-side surface 111 of the first lens element 110 and the image-side surface 162 of the sixth lens element 160 is TD, and the axial distance between the image-side surface 162 of the sixth lens element 160 and the image surface 180 is BL, the following condition is satisfied: TD/BL=6.20.

When an axial distance between the object-side surface 111 of the first lens element 110 and the image surface 180 is TL, and the focal length of the imaging optical lens assembly is f, the following condition is satisfied: TL/f=0.90.

When the focal length of the imaging optical lens assembly is f, and a curvature radius of the image-side surface 162 of the sixth lens element 160 is R12, the following condition is satisfied: f/R12=−0.57.

When a focal length of the first lens element 110 is f1, and a focal length of the second lens element 120 is f2, the following condition is satisfied: |f1/f2|=0.36.

When the focal length of the first lens element 110 is f1, and a focal length of the third lens element 130 is f3, the following condition is satisfied: |f1/f3|=0.55.

When the focal length of the first lens element 110 is f1, and a focal length of the fourth lens element 140 is f4, the following condition is satisfied: |f1/f4|=0.36.

When the focal length of the first lens element 110 is f1, and a focal length of the fifth lens element 150 is f5, the following condition is satisfied: |f1/f5|=0.34.

When the focal length of the first lens element 110 is f1, and a focal length of the sixth lens element 160 is f6, the following condition is satisfied: |f1/f6|=0.26.

When the focal length of the second lens element 120 is f2, and the focal length of the third lens element 130 is f3, the following condition is satisfied: f2/f3=1.54.

The detailed optical data of the 1st embodiment are shown in Table 1 and the aspheric surface data are shown in Table 2 below.

TABLE 1

1st Embodiment
f = 6.63 mm, Fno = 2.40, HFOV = 21.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.707 | | | | |
| 2 | Lens 1 | 1.671 | (ASP) | 1.279 | Plastic | 1.534 | 55.9 | 2.78 |
| 3 | | −9.604 | (ASP) | 0.049 | | | | |
| 4 | Lens 2 | −106.021 | (ASP) | 0.220 | Plastic | 1.669 | 19.4 | −7.77 |
| 5 | | 5.472 | (ASP) | 0.158 | | | | |
| 6 | Ape. Stop | Plano | | 0.193 | | | | |
| 7 | Lens 3 | −79.152 | (ASP) | 0.230 | Plastic | 1.639 | 23.5 | −5.05 |
| 8 | | 3.367 | (ASP) | 0.379 | | | | |
| 9 | Lens 4 | 90.807 | (ASP) | 0.367 | Plastic | 1.669 | 19.4 | 7.73 |
| 10 | | −5.475 | (ASP) | 0.040 | | | | |
| 11 | Lens 5 | −5.350 | (ASP) | 0.240 | Plastic | 1.544 | 56.0 | −8.13 |
| 12 | | 25.958 | (ASP) | 1.201 | | | | |
| 13 | Lens 6 | −3.702 | (ASP) | 0.759 | Plastic | 1.534 | 55.9 | −10.50 |
| 14 | | −11.672 | (ASP) | 0.200 | | | | |
| 15 | IR-cut Filter | Plano | | 0.210 | Glass | 1.517 | 64.2 | — |
| 16 | | Plano | | 0.415 | | | | |
| 17 | Image | Plano | | 0.000 | | | | |

Note:
Reference wavelength is 587.6 nm (d-line).
An effective radius of the stop 101 (Surface 1) is 1.420 mm.
An effective radius of the image-side surface 152 (Surface 12) is 1.305 mm.

TABLE 2

Aspheric Coefficients

| Surface # | 2 | 3 | 4 | 5 | 7 | 8 |
|---|---|---|---|---|---|---|
| k = | −9.5976E−02 | 4.5723E+01 | 7.6911E+01 | 1.3559E+01 | 9.0000E+01 | −1.1225E+01 |
| A4 = | −2.0880E−03 | 4.8383E−04 | 2.3621E−02 | 6.4450E−02 | −1.5266E−02 | −7.8648E−02 |
| A6 = | 2.2360E−03 | 1.1220E−02 | −8.7601E−04 | 4.2091E−03 | 2.3730E−01 | 2.1114E−01 |
| A8 = | −5.6157E−03 | 2.5394E−02 | 3.1804E−02 | 7.7350E−02 | −4.7833E−01 | −2.4837E−01 |
| A10 = | 3.7027E−03 | −2.9837E−02 | −3.2826E−02 | −1.6094E−01 | 1.0421E+00 | 8.2362E−02 |
| A12 = | −9.2465E−04 | 9.3093E−03 | −4.5565E−03 | 1.1680E−01 | −1.6555E+00 | 8.1001E−02 |
| A14 = | — | — | 8.4482E−03 | −3.6666E−02 | 1.4811E+00 | — |
| A16 = | — | — | | | −5.4326E−01 | — |

| Surface # | 9 | 10 | 11 | 12 | 13 | 14 |
|---|---|---|---|---|---|---|
| k = | 9.0000E+01 | −7.3492E+01 | 2.4205E+01 | −7.7575E+01 | −1.9857E+01 | −1.9568E+01 |
| A4 = | −1.2158E−01 | −2.1685E−01 | −2.9561E−01 | −1.4697E−01 | −1.1008E−01 | −9.7506E−02 |
| A6 = | −2.7692E−01 | −3.6484E−02 | 6.3739E−01 | 4.7999E−01 | 8.2713E−02 | 3.5967E−02 |
| A8 = | 4.8079E−01 | 5.6277E−01 | −5.0677E−01 | −7.0824E−01 | −3.4932E−02 | −4.8333E−03 |
| A10 = | −1.0176E+00 | −2.7062E+00 | −1.5125E+00 | 6.8772E−01 | 1.2468E−02 | −2.2177E−03 |
| A12 = | 7.5140E−01 | 5.2303E+00 | 4.5244E+00 | −4.5195E−01 | −3.2248E−03 | 1.1749E−03 |
| A14 = | — | −4.5224E+00 | −4.4195E+00 | 1.7066E−01 | 4.6947E−04 | −2.0384E−04 |
| A16 = | — | 1.4848E+00 | 1.4989E+00 | −2.7002E−02 | −2.8044E−05 | 1.2439E−05 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
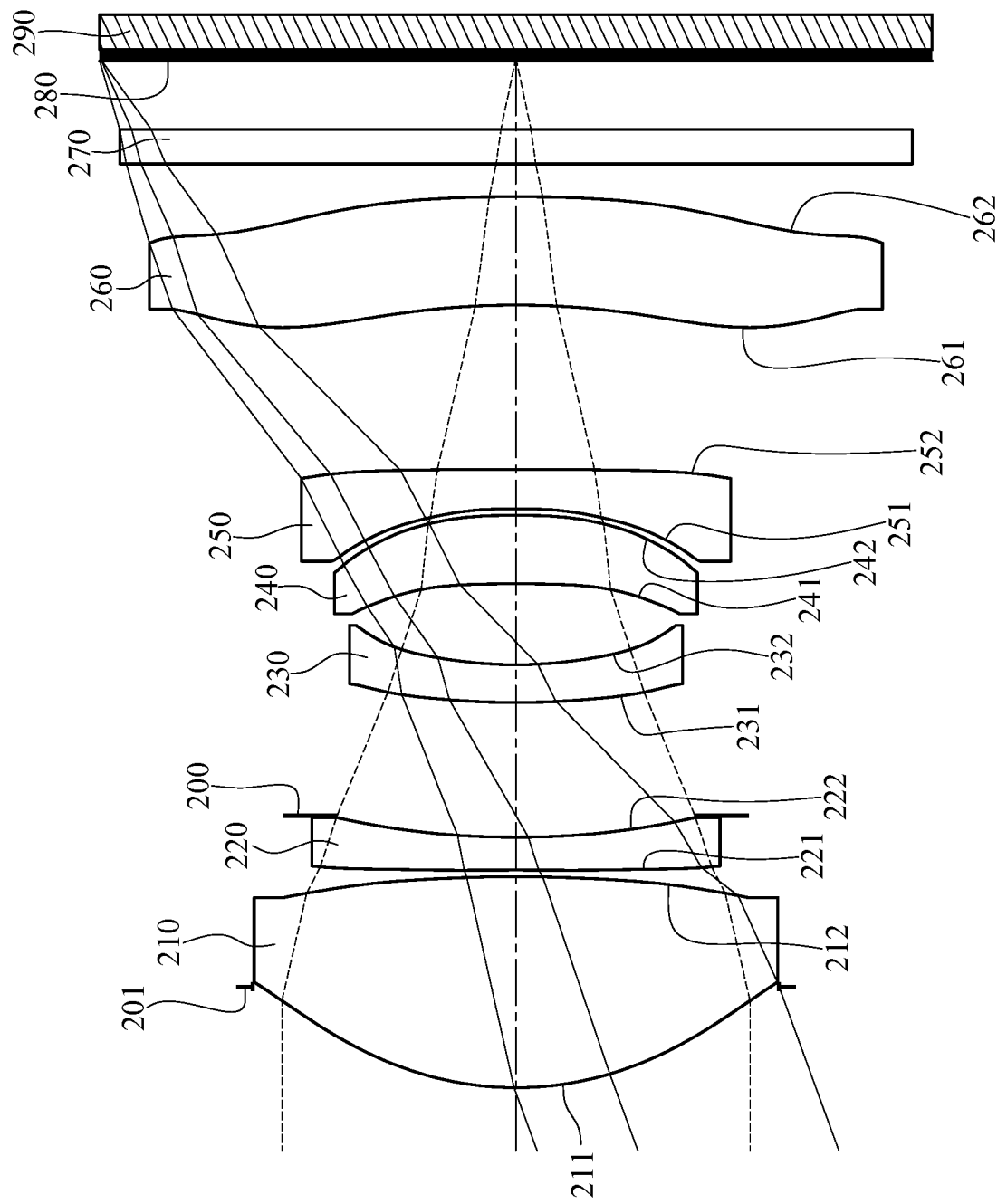
FIG. 3 is a schematic view of an image capturing unit according to the 2nd embodiment of the present disclosure.
Figure 4:
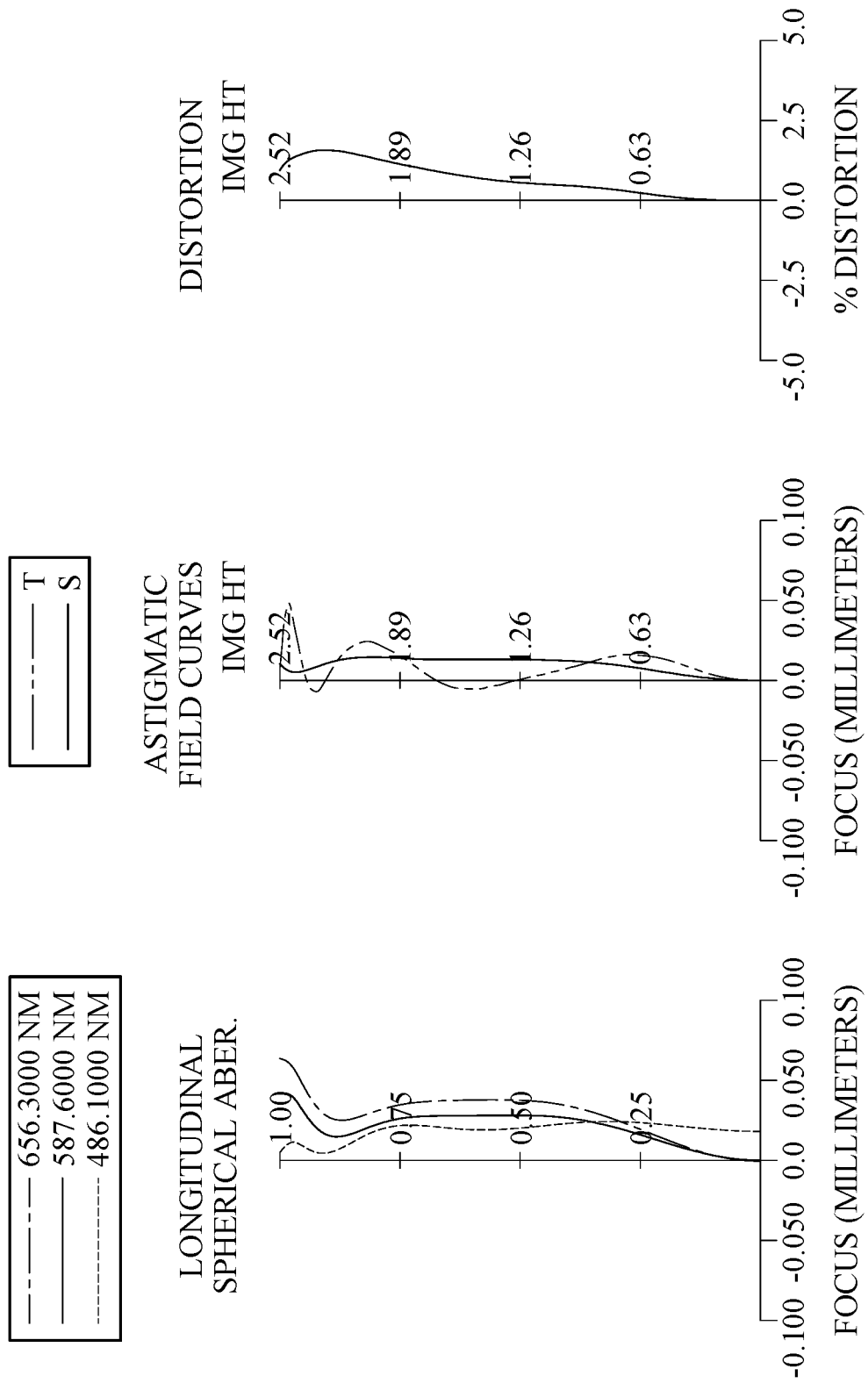
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging optical lens assembly (its reference numeral is omitted) of the present disclosure and an image sensor 290. The imaging optical lens assembly includes, in order from an object side to an image side, a stop 201, a first lens element 210, a second lens element 220, an aperture stop 200, a third lens element 230, a fourth lens element 240, a fifth lens element 250, a sixth lens element 260, an IR-cut filter 270 and an image surface 280. The imaging optical lens assembly includes six lens elements (210, 220, 230, 240, 250 and 260) with no additional lens element disposed between each of the adjacent six lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point. The object-side surface 261 of the sixth lens element 260 has at least one critical point in an off-axis region thereof.

The IR-cut filter 270 is made of glass material and located between the sixth lens element 260 and the image surface 280, and will not affect the focal length of the imaging optical lens assembly. The image sensor 290 is disposed on or near the image surface 280 of the imaging optical lens assembly.

The detailed optical data of the 2nd embodiment are shown in Table 3 and the aspheric surface data are shown in Table 4 below.

TABLE 3

2nd Embodiment
f = 6.83 mm, Fno = 2.40, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.615 | | | | |
| 2 | Lens 1 | 1.973 | (ASP) | 1.285 | Plastic | 1.544 | 55.9 | 2.97 |
| 3 | | −6.830 | (ASP) | 0.040 | | | | |
| 4 | Lens 2 | −25.510 | (ASP) | 0.200 | Plastic | 1.669 | 19.4 | −6.94 |
| 5 | | 5.696 | (ASP) | 0.131 | | | | |
| 6 | Ape. Stop | Plano | | 0.689 | | | | |
| 7 | Lens 3 | 4.438 | (ASP) | 0.230 | Plastic | 1.669 | 19.4 | −8.10 |
| 8 | | 2.389 | (ASP) | 0.493 | | | | |
| 9 | Lens 4 | −14.571 | (ASP) | 0.417 | Plastic | 1.669 | 19.4 | 12.54 |
| 10 | | −5.386 | (ASP) | 0.040 | | | | |
| 11 | Lens 5 | −4.242 | (ASP) | 0.240 | Plastic | 1.544 | 55.9 | −8.12 |
| 12 | | −109.504 | (ASP) | 1.000 | | | | |
| 13 | Lens 6 | −4.725 | (ASP) | 0.660 | Plastic | 1.540 | 40.0 | −18.69 |
| 14 | | −9.320 | (ASP) | 0.200 | | | | |
| 15 | IR-cut Filter | Plano | | 0.210 | Glass | 1.517 | 64.2 | — |
| 16 | | Plano | | 0.416 | | | | |
| 17 | Image | Plano | | 0.000 | | | | |

Note:
Reference wavelength is 587.6 nm (d-line).
An effective radius of the stop 201 (Surface 1) is 1.600 mm.
An effective radius of the image-side surface 252 (Surface 12) is 1.305 mm.

TABLE 4

Aspheric Coefficients

| Surface # | 2 | 3 | 4 | 5 | 7 | 8 |
|---|---|---|---|---|---|---|
| k = | −2.7140E−01 | 1.8392E+01 | 1.6681E+01 | −6.0368E+01 | −9.0000E+01 | −2.4337E+00 |
| A4 = | −2.5209E−03 | 1.0705E−01 | 1.1443E−01 | 7.6355E−02 | 3.0865E−02 | −1.3973E−01 |
| A6 = | −2.3753E−03 | −1.7550E−01 | −1.6204E−01 | −6.5789E−02 | −9.1291E−02 | 3.2441E−01 |
| A8 = | 2.2495E−03 | 1.3658E−01 | 6.3776E−02 | 3.3469E−02 | 5.0813E−01 | −3.3373E−01 |
| A10 = | −2.2923E−03 | −5.0317E−02 | 4.5784E−02 | 5.2292E−02 | −1.0001E+00 | 4.7082E−01 |
| A12 = | 3.7669E−04 | 7.5011E−03 | −4.2749E−02 | −3.9042E−02 | 1.2304E+00 | −2.5989E−01 |
| A14 = | — | — | 9.2556E−03 | 7.8637E−03 | −8.9687E−01 | — |
| A16 = | — | — | — | — | 2.6369E−01 | — |

TABLE 4-continued

Aspheric Coefficients

| Surface # | 9 | 10 | 11 | 12 | 13 | 14 |
|---|---|---|---|---|---|---|
| k = | 5.5903E+01 | −3.3314E+01 | 1.2890E+01 | −9.0000E+01 | −9.0000E+01 | −6.8195E+01 |
| A4 = | −2.5908E−01 | −6.4492E−01 | −6.6540E−01 | −8.3829E−02 | −7.1821E−02 | −1.4915E−02 |
| A6 = | 2.6792E−01 | 1.4051E+00 | 1.9962E+00 | 3.2643E−01 | 4.9705E−02 | −3.0049E−02 |
| A8 = | −6.1100E−01 | −7.7642E+00 | −1.5560E+00 | −5.9905E−01 | −6.2464E−03 | 3.0698E−02 |
| A10 = | 8.1829E−01 | −3.3804E+00 | −3.5264E+00 | 5.5924E−01 | −3.7122E−03 | −1.3220E−02 |
| A12 = | −3.6462E−01 | 7.0310E+00 | 8.2127E+00 | −2.7738E−01 | 1.7604E−03 | 3.1679E−03 |
| A14 = | — | −5.1781E+00 | −6.1904E+00 | 6.6350E−02 | −3.0319E−04 | −4.0087E−04 |
| A16 = | — | 1.3550E+00 | 1.6475E+00 | −5.3591E−03 | 1.9062E−05 | 2.0370E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.83 | T23/BL | 0.99 |
| Fno | 2.40 | ΣAT/(T23 + T56) | 1.31 |
| HFOV [deg.] | 20.0 | TD/BL | 6.57 |
| V2 + V3 + V4 | 58.3 | TL/f | 0.92 |
| V32 | 3 | f/R12 | −0.73 |
| V24 | 3 | |f1/f2| | 0.43 |
| CT1/(CT2 + CT3 + CT4 + CT5) | 1.18 | |f1/f3| | 0.37 |
| CT1/CT6 | 1.95 | |f1/f4| | 0.24 |
| T23/T34 | 1.66 | |f1/f5| | 0.37 |
| T23/T45 | 20.50 | |f1/f6| | 0.16 |
| T23/(T34 + T45) | 1.54 | f2/f3 | 0.86 |

3rd Embodiment

Figure 5:
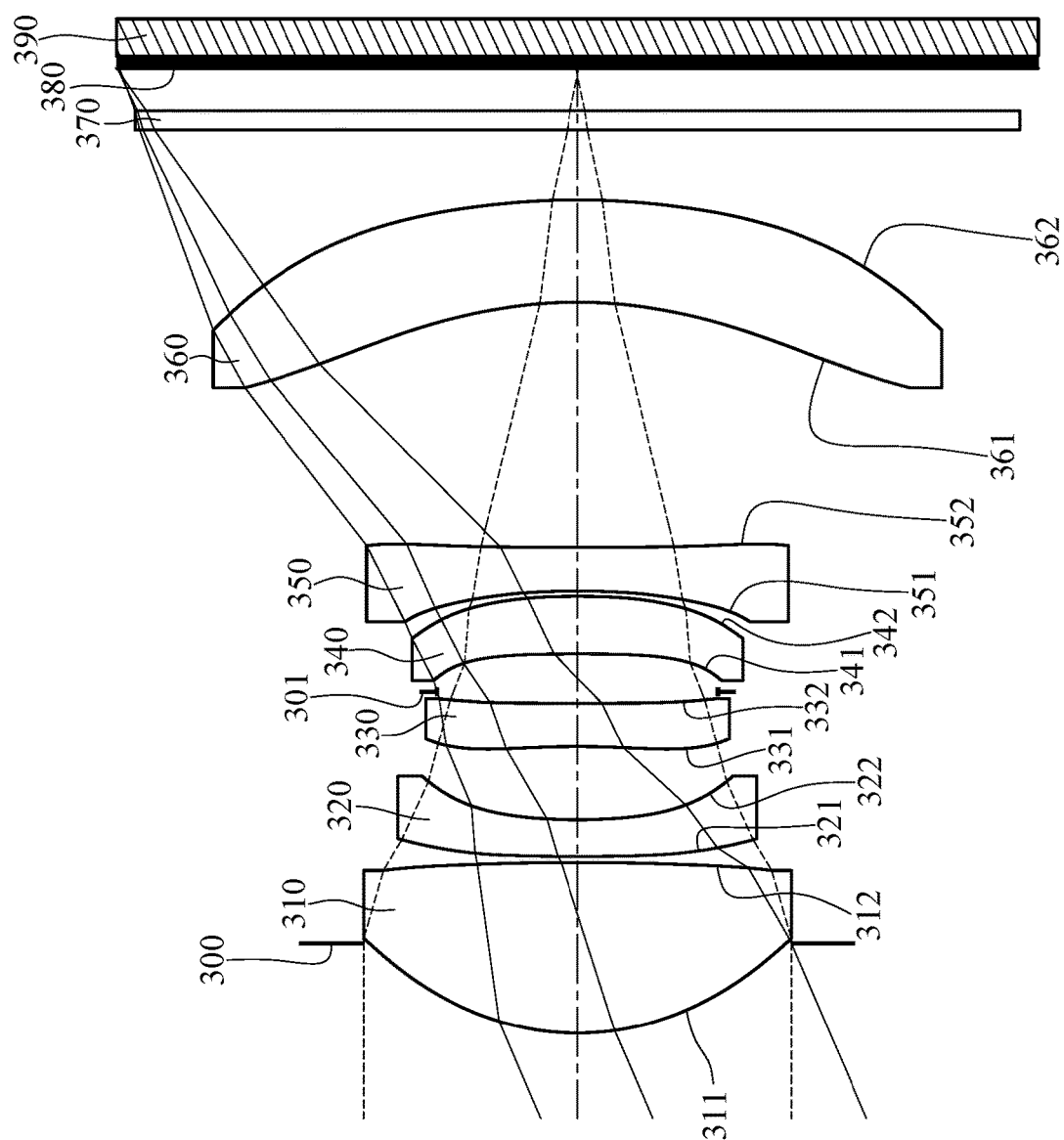
FIG. 5 is a schematic view of an image capturing unit according to the 3rd embodiment of the present disclosure.
Figure 6:
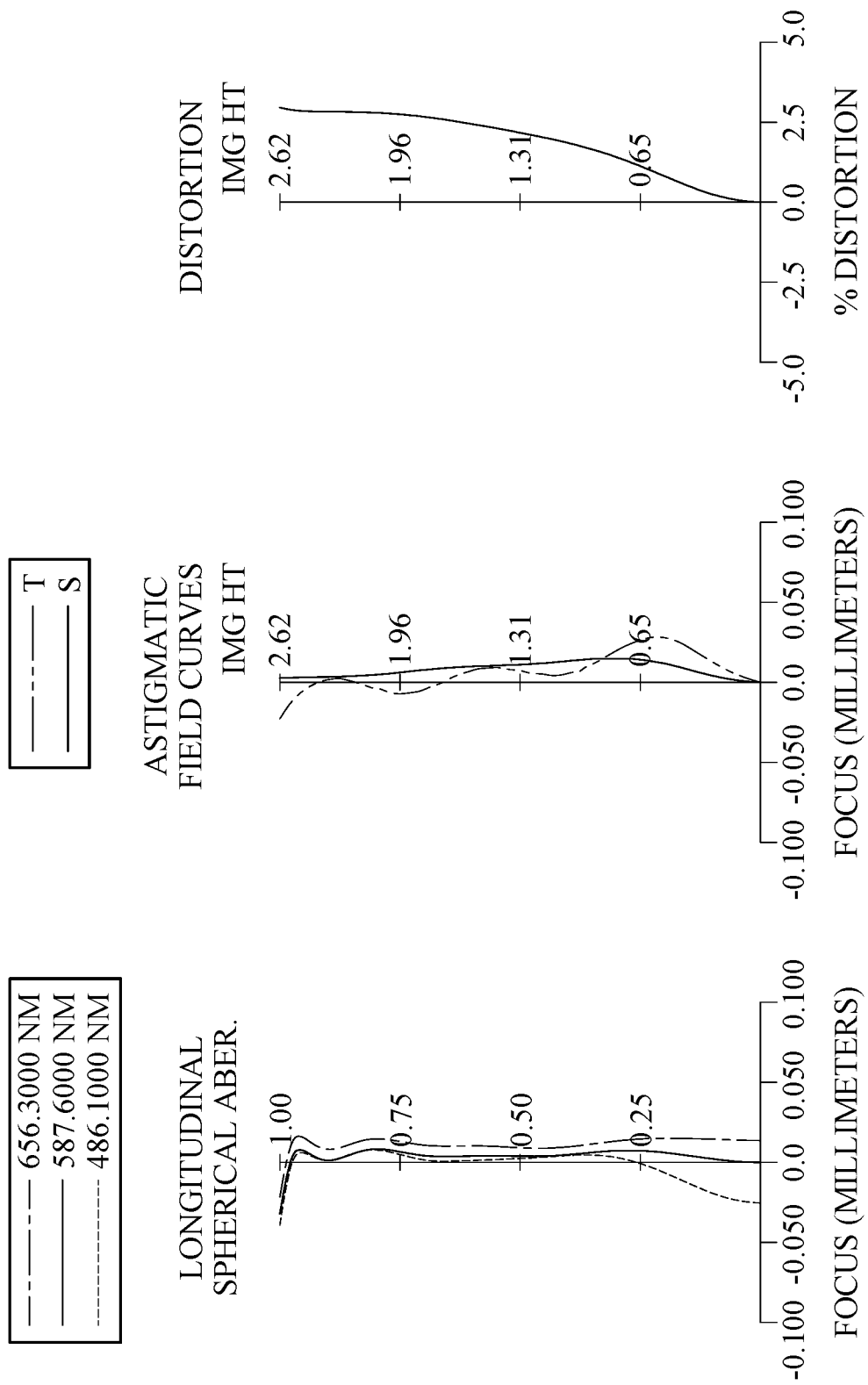
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging optical lens assembly (its reference numeral is omitted) of the present disclosure and an image sensor 390. The imaging optical lens assembly includes, in order from an object side to an image side, an aperture stop 300, a first lens element 310, a second lens element 320, a third lens element 330, a stop 301, a fourth lens element 340, a fifth lens element 350, a sixth lens element 360, an IR-cut filter 370 and an image surface 380. The imaging optical lens assembly includes six lens elements (310, 320, 330, 340, 350 and 360) with no additional lens element disposed between each of the adjacent six lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being planar in a paraxial region thereof. The fifth lens element 350 is made of plastic material and has the object-side surface 351 and the image-side surface 352 being both aspheric. The image-side surface 352 of the fifth lens element 350 has at least one inflection point. The image-side surface 352 of the fifth lens element 350 has at least one critical point in an off-axis region thereof.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point.

The IR-cut filter 370 is made of glass material and located between the sixth lens element 360 and the image surface 380, and will not affect the focal length of the imaging optical lens assembly. The image sensor 390 is disposed on or near the image surface 380 of the imaging optical lens assembly.

The detailed optical data of the 3rd embodiment are shown in Table 5 and the aspheric surface data are shown in Table 6 below.

TABLE 5

3rd Embodiment
f = 5.91 mm, Fno = 2.43, HFOV = 23.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.511 | | | | |
| 2 | Lens 1 | 1.533 | (ASP) | 0.970 | Plastic | 1.545 | 56.0 | 2.85 |
| 3 | | 100.000 | (ASP) | 0.035 | | | | |
| 4 | Lens 2 | 7.522 | (ASP) | 0.210 | Plastic | 1.660 | 20.4 | −8.36 |
| 5 | | 3.147 | (ASP) | 0.417 | | | | |
| 6 | Lens 3 | −5.008 | (ASP) | 0.249 | Plastic | 1.624 | 22.7 | −7.64 |
| 7 | | 100.000 | (ASP) | 0.066 | | | | |
| 8 | Stop | Plano | | 0.214 | | | | |
| 9 | Lens 4 | −19.643 | (ASP) | 0.328 | Plastic | 1.669 | 19.5 | 8.10 |
| 10 | | −4.273 | (ASP) | 0.030 | | | | |
| 11 | Lens 5 | −4.485 | (ASP) | 0.250 | Plastic | 1.544 | 55.9 | −8.25 |
| 12 | | ∞ | (ASP) | 1.398 | | | | |
| 13 | Lens 6 | −2.487 | (ASP) | 0.582 | Plastic | 1.544 | 55.9 | −15.12 |
| 14 | | −3.860 | (ASP) | 0.400 | | | | |
| 15 | IR-cut Filter | Plano | | 0.110 | Glass | 1.517 | 64.2 | — |
| 16 | | Plano | | 0.242 | | | | |
| 17 | Image | Plano | | 0.000 | | | | |

Note:
Reference wavelength is 587.6 nm (d-line).
An effective radius of the stop 301 (Surface 8) is 0.800 mm.

TABLE 6

Aspheric Coefficients

| Surface # | 2 | 3 | 4 | 5 | 6 | 7 |
|---|---|---|---|---|---|---|
| k = | −5.4514E−01 | 0.0000E+00 | −7.7107E+01 | −9.6188E+00 | −9.0780E+00 | 0.0000E+00 |
| A4 = | 1.2262E−02 | −4.2821E−01 | −3.7660E−01 | 3.3226E−02 | 8.1274E−02 | −2.0576E−02 |
| A6 = | −3.3591E−03 | 2.1912E+00 | 2.4728E+00 | 9.6773E−01 | 6.2916E−01 | 5.4644E−01 |
| A8 = | 2.5150E−02 | −6.2148E+00 | −6.9946E+00 | −3.1525E+00 | −2.4023E+00 | −1.2851E+00 |
| A10 = | −7.7387E−02 | 1.1040E+01 | 1.2288E+01 | 9.4168E+00 | 8.5063E+00 | 1.4886E+00 |
| A12 = | 1.5051E−01 | −1.2933E+01 | −1.4549E+01 | −2.4768E+01 | −2.4878E+01 | −1.9242E+00 |
| A14 = | −1.8610E−01 | 1.0046E+01 | 1.1960E+01 | 4.8127E+01 | 5.1371E+01 | 5.9648E+00 |
| A16 = | 1.3581E−01 | −5.0028E+00 | −6.7813E+00 | −5.9564E+01 | −6.6448E+01 | −1.3162E+01 |
| A18 = | −5.3594E−02 | 1.4523E+00 | 2.4549E+00 | 4.1160E+01 | 4.7809E+01 | 1.4087E+01 |
| A20 = | 8.7440E−03 | −1.8753E−01 | −4.3002E−01 | −1.2085E+01 | −1.4591E+01 | −5.9325E+00 |

| Surface # | 9 | 10 | 11 | 12 | 13 | 14 |
|---|---|---|---|---|---|---|
| k = | 0.0000E+00 | −3.7976E+01 | 1.2886E+01 | 0.0000E+00 | −8.6857E+00 | 4.2580E−01 |
| A4 = | −2.8966E−01 | −2.2349E−01 | 4.7150E−02 | 9.5747E−02 | −3.8351E−03 | 6.0599E−02 |
| A6 = | 7.6531E−01 | −6.7627E−01 | −1.3600E+00 | −3.9158E−01 | −4.7134E−02 | −8.2854E−02 |
| A8 = | −4.6483E+00 | 5.3016E+00 | 7.0902E+00 | 1.0650E+00 | 5.2041E−02 | 5.5345E−02 |
| A10 = | 2.0390E+01 | −1.7678E+01 | −1.8934E+01 | −1.7031E+00 | −2.7189E−02 | −2.4327E−02 |
| A12 = | −6.3642E+01 | 3.5257E+01 | 3.1112E+01 | 1.6811E+00 | 8.6972E−03 | 7.3934E−03 |
| A14 = | 1.2587E+02 | −4.6677E+01 | −3.3686E+01 | −1.0689E+00 | −1.7773E−03 | −1.5677E−03 |
| A16 = | −1.5143E+02 | 4.0566E+01 | 2.3852E+01 | 4.3012E−01 | 2.1731E−04 | 2.2557E−04 |
| A18 = | 1.0070E+02 | −2.0823E+01 | −1.0059E+01 | −1.0002E−01 | −1.2765E−05 | −2.0322E−05 |
| A20 = | −2.8053E+01 | 4.7699E+00 | 1.8933E+00 | 1.0205E−02 | 1.4831E−07 | 8.9114E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| | | | |
|---|---|---|---|
| f [mm] | 5.91 | T23/BL | 0.55 |
| Fno | 2.43 | ΣAT/(T23 + T56) | 1.19 |

-continued

3rd Embodiment

| | | | |
|---|---|---|---|
| HFOV [deg.] | 23.3 | TD/BL | 6.31 |
| V2 + V3 + V4 | 62.6 | TL/f | 0.93 |
| V32 | 3 | f/R12 | −1.53 |
| V24 | 3 | |f1/f2| | 0.34 |
| CT1/(CT2 + CT3 + CT4 + CT5) | 0.94 | |f1/f3| | 0.37 |
| CT1/CT6 | 1.67 | |f1/f4| | 0.35 |
| T23/T34 | 1.49 | |f1/f5| | 0.35 |
| T23/T45 | 13.90 | |f1/f6| | 0.19 |
| T23/(T34 + T45) | 1.35 | f2/f3 | 1.09 |

4th Embodiment

Figure 7:
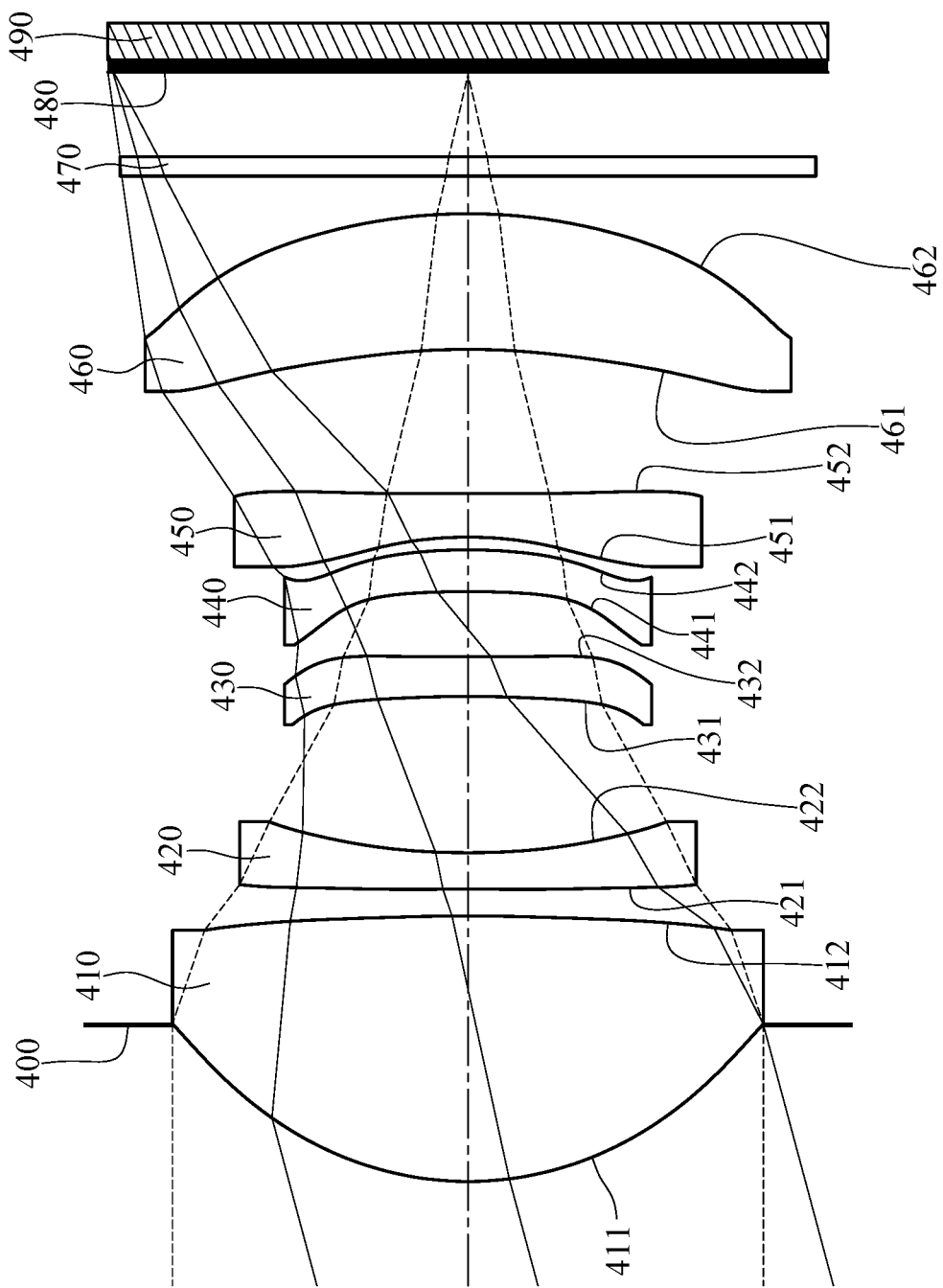
FIG. 7 is a schematic view of an image capturing unit according to the 4th embodiment of the present disclosure.
Figure 8:
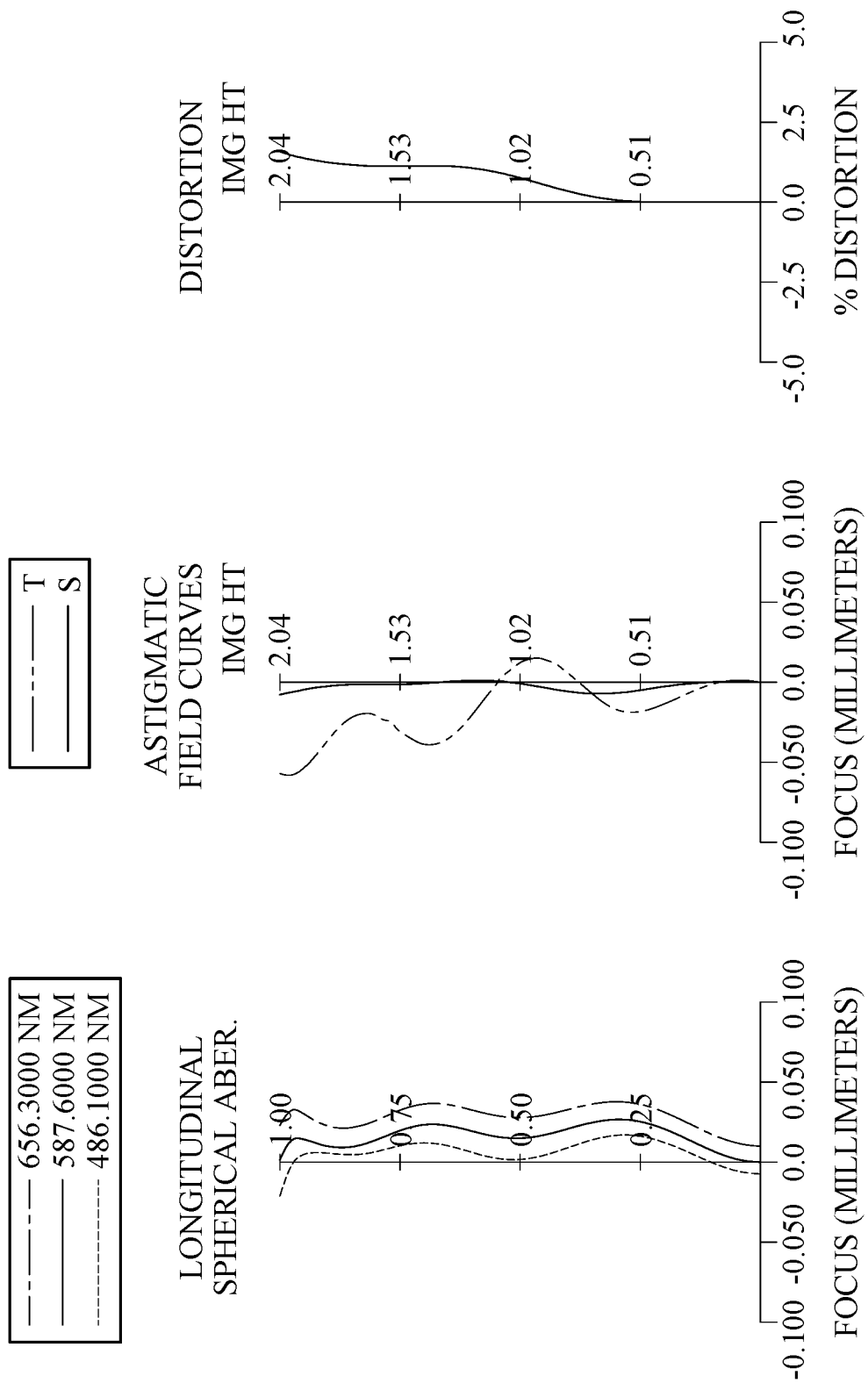
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging optical lens assembly (its reference numeral is omitted) of the present disclosure and an image sensor 490. The imaging optical lens assembly includes, in order from an object side to an image side, an aperture stop 400, a first lens element 410, a second lens element 420, a third lens element 430, a fourth lens element 440, a fifth lens element 450, a sixth lens element 460, an IR-cut filter 470 and an image surface 480. The imaging optical lens assembly includes six lens elements (410, 420, 430, 440, 450 and 460) with no additional lens element disposed between each of the adjacent six lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has at least one inflection point. The image-side surface 452 of the fifth lens element 450 has at least one inflection point. The image-side surface 452 of the fifth lens element 450 has at least one critical point in an off-axis region thereof. The sixth lens element 460 with positive refractive power has an object-side surface 461 being concave in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point. The object-side surface 461 of the sixth lens element 460 has at least one critical point in an off-axis region thereof.

The IR-cut filter 470 is made of glass material and located between the sixth lens element 460 and the image surface 480, and will not affect the focal length of the imaging optical lens assembly. The image sensor 490 is disposed on or near the image surface 480 of the imaging optical lens assembly.

The detailed optical data of the 4th embodiment are shown in Table 7 and the aspheric surface data are shown in Table 8 below.

TABLE 7

4th Embodiment
f = 7.47 mm, Fno = 2.20, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.900 | | | | |
| 2 | Lens 1 | 1.871 | (ASP) | 1.527 | Plastic | 1.545 | 56.1 | 3.04 |
| 3 | | −10.327 | (ASP) | 0.154 | | | | |
| 4 | Lens 2 | −24.253 | (ASP) | 0.210 | Plastic | 1.669 | 19.5 | −5.97 |
| 5 | | 4.793 | (ASP) | 0.899 | | | | |
| 6 | Lens 3 | −5.610 | (ASP) | 0.230 | Plastic | 1.669 | 19.5 | −11.46 |
| 7 | | −21.251 | (ASP) | 0.373 | | | | |
| 8 | Lens 4 | −4.765 | (ASP) | 0.240 | Plastic | 1.669 | 19.5 | 9.33 |
| 9 | | −2.756 | (ASP) | 0.073 | | | | |
| 10 | Lens 5 | −2.180 | (ASP) | 0.250 | Plastic | 1.544 | 56.0 | −3.81 |
| 11 | | 44.117 | (ASP) | 0.830 | | | | |
| 12 | Lens 6 | −4.001 | (ASP) | 0.780 | Plastic | 1.660 | 20.4 | 17.17 |
| 13 | | −3.186 | (ASP) | 0.217 | | | | |
| 14 | IR-cut Filter | Plano | | 0.110 | Glass | 1.517 | 64.2 | — |
| 15 | | Plano | | 0.487 | | | | |
| 16 | Image | Plano | | 0.000 | | | | |

Note:
Reference wavelength is 587.6 nm (d-line).
An effective radius of the image-side surface 422 (Surface 5) is 1.145 mm.
An effective radius of the object-side surface 451 (Surface 10) is 1.120 mm.

TABLE 8

Aspheric Coefficients

| Surface # | 2 | 3 | 4 | 5 | 6 | 7 |
|---|---|---|---|---|---|---|
| k = | −2.2178E−01 | 2.7081E+01 | −1.4721E+01 | −1.9031E+01 | 1.8436E+01 | 9.0000E+01 |
| A4 = | −2.7574E−03 | 5.5110E−02 | 1.0690E−01 | 1.0162E−01 | 1.9488E−01 | 2.4316E−01 |
| A6 = | 4.7826E−03 | −5.1929E−02 | −1.1998E−01 | −7.1727E−02 | −4.4289E−01 | −6.5093E−01 |
| A8 = | −4.6271E−03 | 2.4863E−02 | 2.7101E−02 | −5.2370E−02 | 5.5522E−01 | 7.1475E−01 |
| A10 = | 2.0615E−03 | −6.0959E−03 | 3.3503E−02 | 1.1040E−01 | −9.0423E−01 | −8.0633E−01 |
| A12 = | −4.1632E−04 | 6.1482E−04 | −2.1403E−02 | −5.4378E−02 | 1.2949E+00 | 5.8255E−01 |
| A14 = | — | — | 3.8079E−03 | 8.4099E−03 | −1.1512E+00 | −2.1680E−01 |
| A16 = | — | — | — | — | 4.0754E−01 | 3.9168E−02 |

| Surface # | 8 | 9 | 10 | 11 | 12 | 13 |
|---|---|---|---|---|---|---|
| k = | 4.1610E+00 | −8.4948E+01 | −3.2635E+01 | −5.9564E+01 | −3.7670E+01 | −7.1773E+00 |
| A4 = | 2.1707E−01 | −1.3551E−01 | −2.3694E−01 | −5.6532E−02 | −5.0018E−02 | −3.7371E−02 |
| A6 = | −2.0307E+00 | −8.5844E−01 | −4.0950E−01 | 2.5291E−01 | 1.0129E−01 | 3.0433E−02 |
| A8 = | 6.5350E+00 | 2.8855E+00 | 2.6169E+00 | −4.2967E−01 | −1.0867E−01 | −1.7714E−02 |
| A10 = | −1.5702E+01 | −4.7694E+00 | −4.0129E+00 | 3.9690E−01 | 6.1516E−02 | −4.6926E−04 |
| A12 = | 2.1154E+01 | 4.5527E+00 | 2.6771E+00 | −2.2518E−01 | −1.9630E−02 | 3.2792E−03 |
| A14 = | −1.3860E+01 | −2.1231E+00 | −7.0132E−01 | 7.4158E−02 | 3.4280E−03 | −1.0733E−03 |
| A16 = | 3.4891E+00 | 3.5528E−01 | 2.1885E−02 | −1.0881E−02 | −2.5344E−04 | 1.1577E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 7.47 | T23/BL | 1.10 |
| Fno | 2.20 | ΣAT/(T23 + T56) | 1.35 |
| HFOV [deg.] | 15.0 | TD/BL | 6.84 |
| V2 + V3 + V4 | 58.4 | TL/f | 0.85 |
| V32 | 4 | f/R12 | −2.34 |
| V24 | 4 | |f1/f2| | 0.51 |
| CT1/(CT2 + CT3 + CT4 + CT5) | 1.64 | |f1/f3| | 0.27 |
| CT1/CT6 | 1.96 | |f1/f4| | 0.33 |
| T23/T34 | 2.41 | |f1/f5| | 0.80 |
| T23/T45 | 12.32 | |f1/f6| | 0.18 |
| T23/(T34 + T45) | 2.02 | f2/f3 | 0.52 |

5th Embodiment

Figure 9:
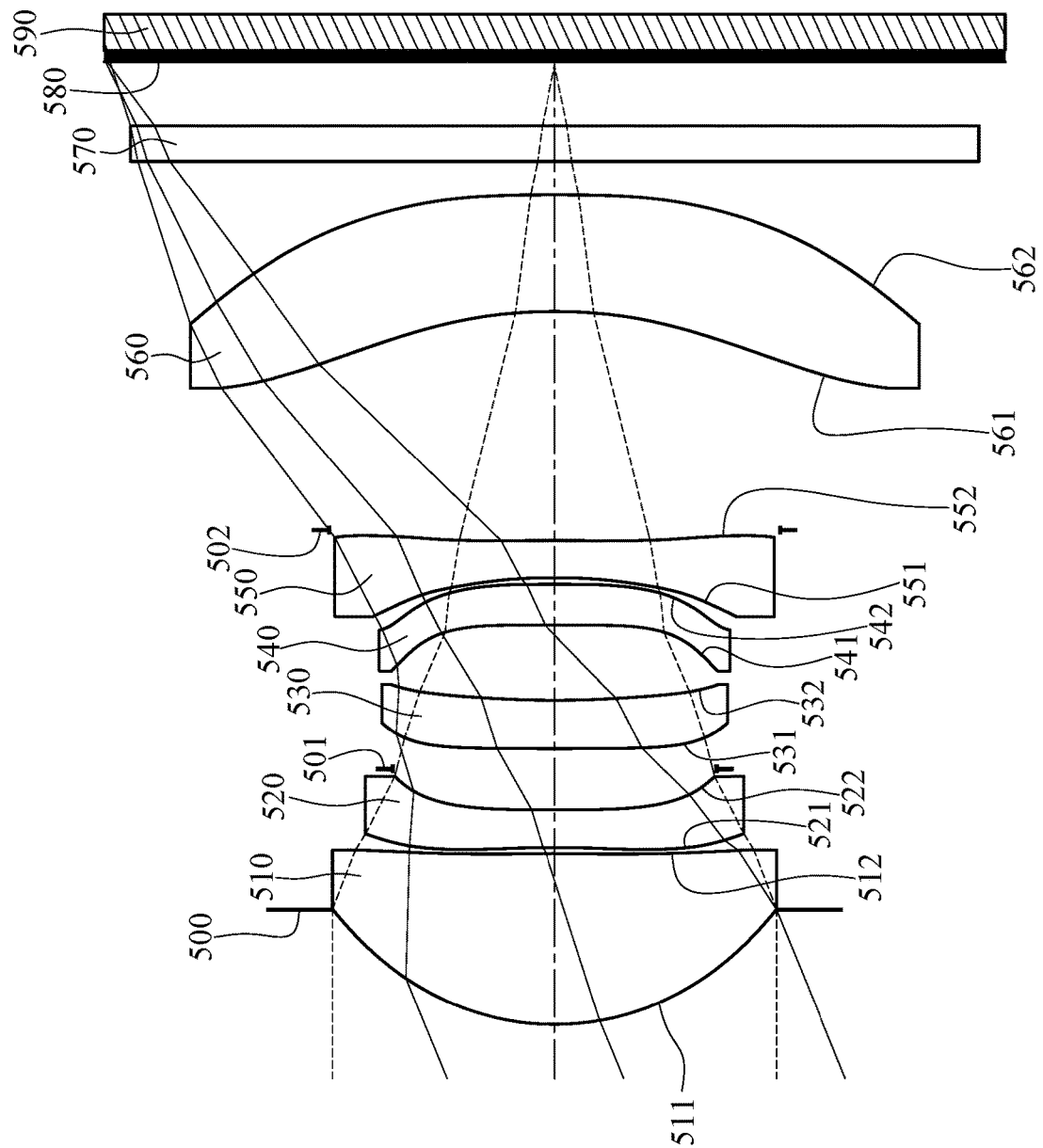
FIG. 9 is a schematic view of an image capturing unit according to the 5th embodiment of the present disclosure.
Figure 10:
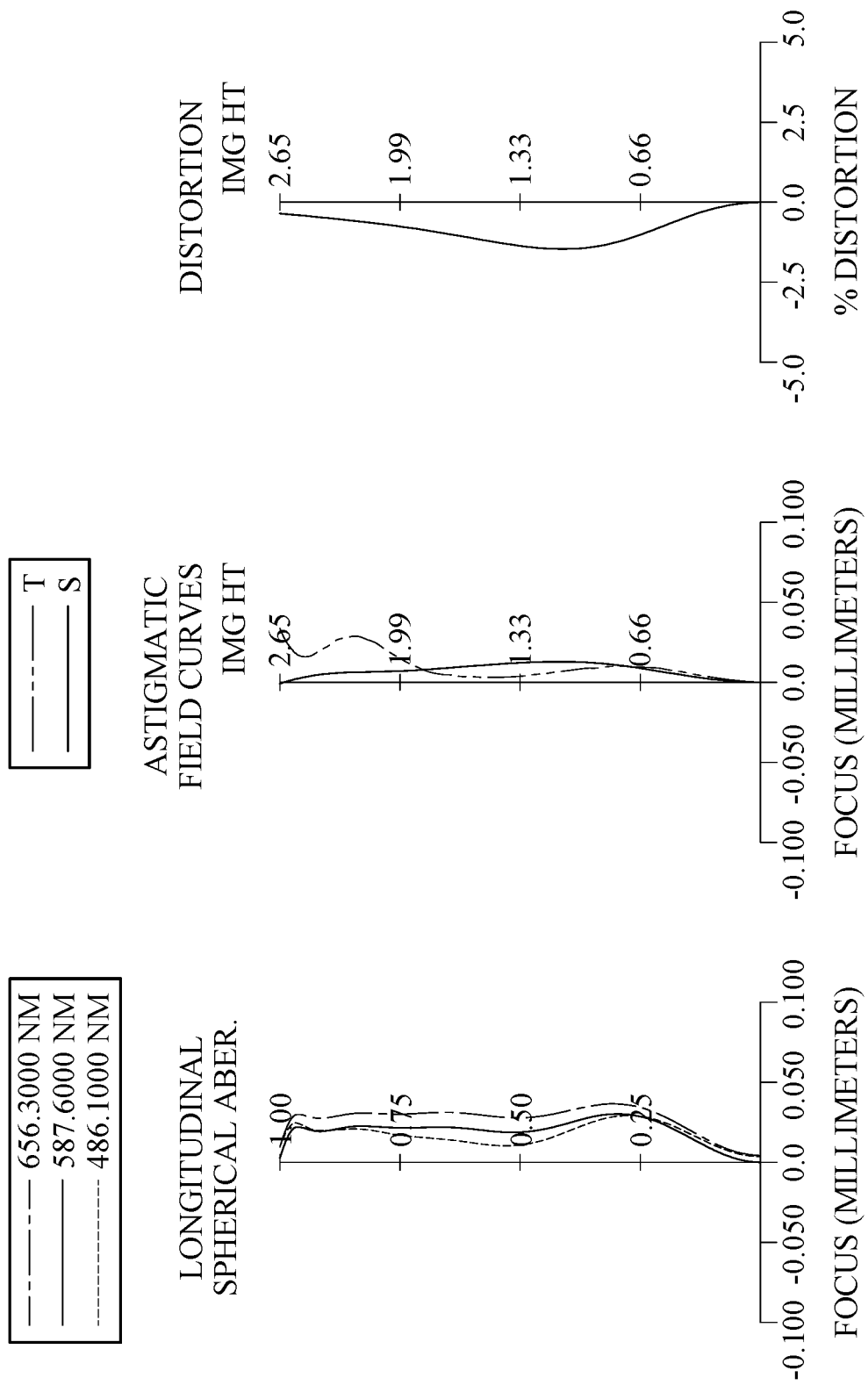
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging optical lens assembly (its reference numeral is omitted) of the present disclosure and an image sensor 590. The imaging optical lens assembly includes, in order from an object side to an image side, an aperture stop 500, a first lens element 510, a second lens element 520, a stop 501, a third lens element 530, a fourth lens element 540, a fifth lens element 550, a stop 502, a sixth lens element 560, an IR-cut filter 570 and an image surface 580. The imaging optical lens assembly includes six lens elements (510, 520, 530, 540, 550 and 560) with no additional lens element disposed between each of the adjacent six lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The image-side surface 552 of the fifth lens element 550 has at least one inflection point. The image-side surface 552 of the fifth lens element 550 has at least one critical point in an off-axis region thereof.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has at least one inflection point.

The IR-cut filter 570 is made of glass material and located between the sixth lens element 560 and the image surface 580, and will not affect the focal length of the imaging optical lens assembly. The image sensor 590 is disposed on or near the image surface 580 of the imaging optical lens assembly.

The detailed optical data of the 5th embodiment are shown in Table 9 and the aspheric surface data are shown in Table 10 below.

TABLE 9

5th Embodiment
f = 6.49 mm, Fno = 2.48, HFOV = 22.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.678 | | | | |
| 2 | Lens 1 | 1.530 | (ASP) | 1.010 | Plastic | 1.545 | 56.1 | 2.72 |
| 3 | | −34.483 | (ASP) | 0.037 | | | | |
| 4 | Lens 2 | −5.726 | (ASP) | 0.220 | Plastic | 1.671 | 19.5 | −6.82 |
| 5 | | 23.056 | (ASP) | 0.243 | | | | |
| 6 | Stop | Plano | | 0.120 | | | | |
| 7 | Lens 3 | 41.918 | (ASP) | 0.288 | Plastic | 1.614 | 26.0 | −10.72 |
| 8 | | 5.672 | (ASP) | 0.443 | | | | |
| 9 | Lens 4 | 26.298 | (ASP) | 0.242 | Plastic | 1.671 | 19.5 | 26.51 |
| 10 | | −54.712 | (ASP) | 0.038 | | | | |
| 11 | Lens 5 | −4.582 | (ASP) | 0.220 | Plastic | 1.544 | 56.0 | −10.45 |
| 12 | | −23.965 | (ASP) | 0.062 | | | | |
| 13 | Stop | Plano | | 1.292 | | | | |
| 14 | Lens 6 | −3.065 | (ASP) | 0.689 | Plastic | 1.534 | 55.9 | −7.26 |
| 15 | | −15.796 | (ASP) | 0.200 | | | | |
| 16 | IR-cut Filter | Plano | | 0.210 | Glass | 1.517 | 64.2 | — |
| 17 | | Plano | | 0.377 | | | | |
| 18 | Image | Plano | | 0.000 | | | | |

Note:

Reference wavelength is 587.6 nm (d-line).

An effective radius of the stop 501 (Surface 6) is 0.955 mm.

An effective radius of the stop 502 (Surface 13) is 1.330 mm.

TABLE 10

| Aspheric Coefficients | | | | | | |
|---|---|---|---|---|---|---|
| Surface # | 2 | 3 | 4 | 5 | 7 | 8 |
| k = | −2.8688E−01 | 9.0000E+01 | −8.2273E+01 | −8.8135E+01 | 9.0000E+01 | 2.5306E+01 |
| A4 = | 3.3299E−03 | 4.7693E−02 | 1.2079E−01 | 1.8393E−01 | 2.4101E−03 | −8.1633E−02 |
| A6 = | 8.6044E−03 | 1.3114E−03 | −2.8014E−02 | −1.2356E−01 | 2.9633E−02 | 4.2138E−02 |
| A8 = | −5.9891E−03 | −4.4109E−02 | 4.5799E−03 | 4.8212E−01 | 2.5267E−01 | 1.5230E−01 |
| A10 = | 3.1111E−03 | 3.3761E−02 | 1.6991E−02 | −8.4396E−01 | −3.6356E−01 | −3.0596E−01 |
| A12 = | −1.1177E−03 | −8.6490E−03 | −1.1690E−02 | 9.3727E−01 | 2.9633E−01 | 2.5854E−01 |
| A14 = | — | — | — | −3.9930E−01 | −9.3552E−02 | −8.1737E−02 |

| Surface # | 9 | 10 | 11 | 12 | 14 | 15 |
|---|---|---|---|---|---|---|
| k = | −1.5640E+01 | −7.0095E+01 | −5.8012E+00 | −9.0000E+01 | −1.1936E+01 | −9.0000E+01 |
| A4 = | −3.2735E−01 | −6.4765E−01 | −5.1951E−01 | 1.7287E−02 | −1.0601E−01 | −1.3196E−01 |
| A6 = | 8.7255E−01 | 1.8916E+00 | 1.9910E+00 | 4.1976E−01 | 9.8051E−02 | 9.3640E−02 |
| A8 = | −5.1441E+00 | −4.7064E+00 | −3.0119E+00 | −1.0349E+00 | −4.9694E−02 | −4.8290E−02 |
| A10 = | 1.4782E+01 | 7.6945E+00 | 7.6936E−01 | 1.1361E+00 | 1.4744E−02 | 1.7231E−02 |
| A12 = | −2.3137E+01 | −8.7239E+00 | 2.1464E+00 | −6.7823E−01 | −2.0737E−03 | −4.2681E−03 |
| A14 = | 1.8021E+01 | 5.7950E+00 | −1.9759E+00 | 2.1448E−01 | −9.9228E−06 | 6.8777E−04 |
| A16 = | −5.3931E+00 | −1.5556E+00 | 5.0968E−01 | −2.8385E−02 | 3.7273E−05 | −6.2934E−05 |
| A18 = | — | — | — | — | −3.0929E−06 | 2.4336E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 6.49 | T23/BL | 0.46 |
| Fno | 2.48 | ΣAT/(T23 + T56) | 1.30 |
| HFOV [deg.] | 22.2 | TD/BL | 6.23 |
| V2 + V3 + V4 | 64.9 | TL/f | 0.88 |
| V32 | 3 | f/R12 | −0.41 |
| V24 | 2 | |f1/f2| | 0.40 |
| CT1/(CT2 + CT3 + CT4 + CT5) | 1.04 | |f1/f3| | 0.25 |
| CT1/CT6 | 1.47 | |f1/f4| | 0.10 |
| T23/T34 | 0.82 | |f1/f5| | 0.26 |
| T23/T45 | 9.55 | |f1/f6| | 0.37 |
| T23/(T34 + T45) | 0.75 | f2/f3 | 0.64 |

6th Embodiment

Figure 11:
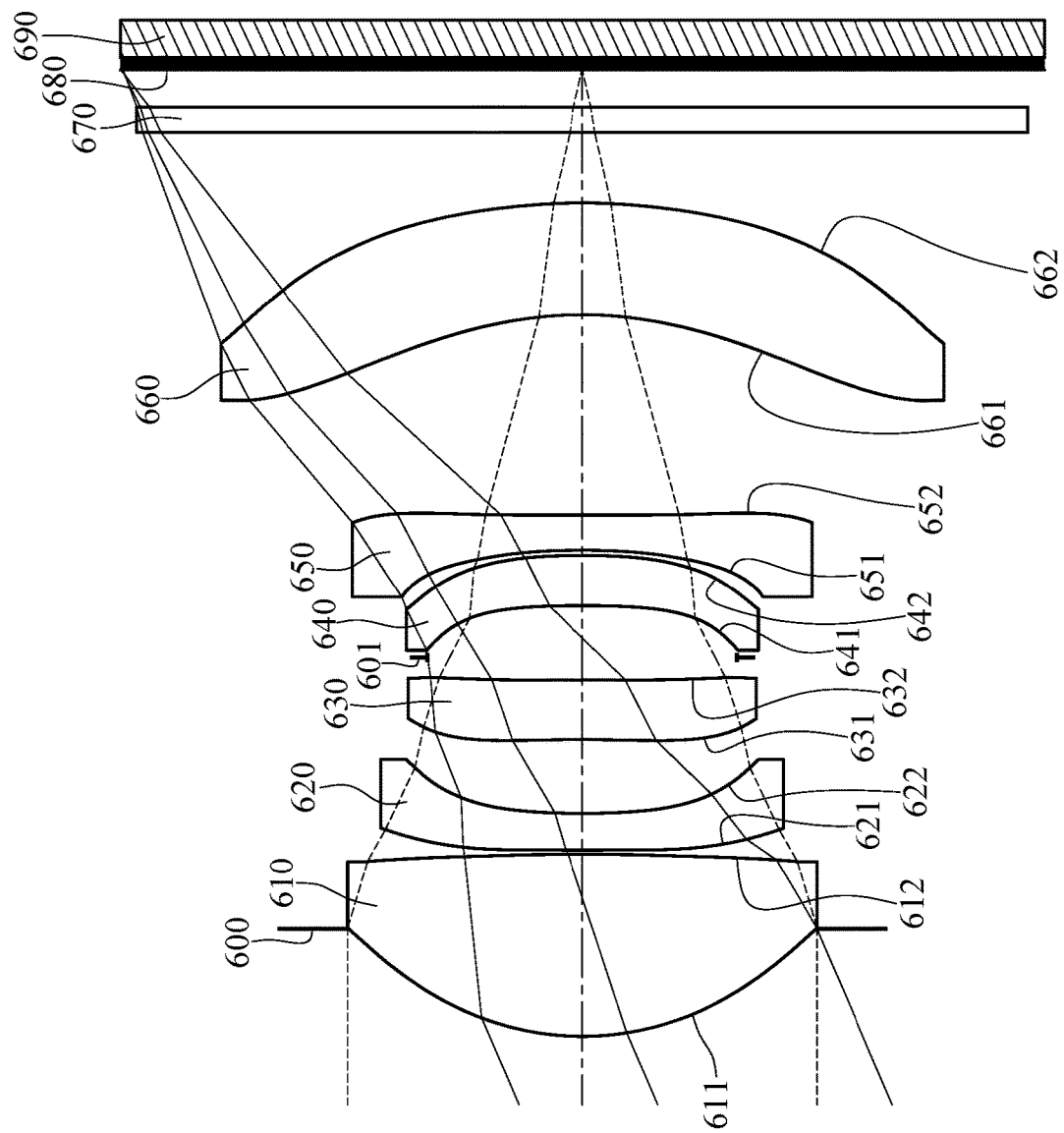
FIG. 11 is a schematic view of an image capturing unit according to the 6th embodiment of the present disclosure.
Figure 12:
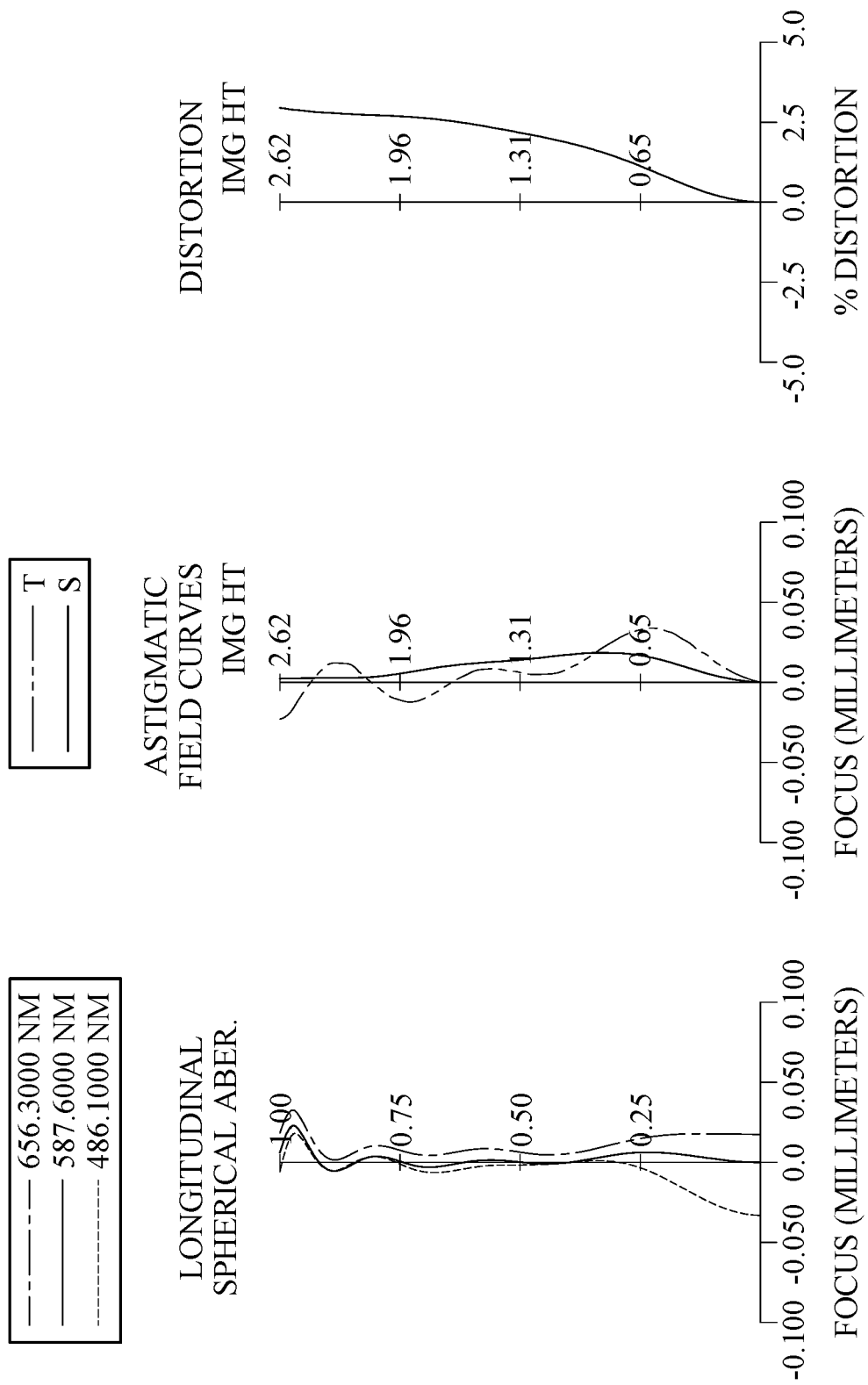
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging optical lens assembly (its reference numeral is omitted) of the present disclosure and an image sensor 690. The imaging optical lens assembly includes, in order from an object side to an image side, an aperture stop 600, a first lens element 610, a second lens element 620, a third lens element 630, a stop 601, a fourth lens element 640, a fifth lens element 650, a sixth lens element 660, an IR-cut filter 670 and an image surface 680. The imaging optical lens assembly includes six lens elements (610, 620, 630, 640, 650 and 660) with no additional lens element disposed between each of the adjacent six lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one inflection point. The image-side surface 652 of the fifth lens element 650 has at least one critical point in an off-axis region thereof.

The sixth lens element 660 with negative refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point.

The IR-cut filter 670 is made of glass material and located between the sixth lens element 660 and the image surface 680, and will not affect the focal length of the imaging optical lens assembly. The image sensor 690 is disposed on or near the image surface 680 of the imaging optical lens assembly.

The detailed optical data of the 6th embodiment are shown in Table 11 and the aspheric surface data are shown in Table 12 below.

TABLE 11

6th Embodiment
f = 5.92 mm, Fno = 2.22, HFOV = 23.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.611 | | | | |
| 2 | Lens 1 | 1.600 | (ASP) | 1.038 | Plastic | 1.544 | 56.0 | 3.00 |
| 3 | | 59.440 | (ASP) | 0.024 | | | | |
| 4 | Lens 2 | 17.083 | (ASP) | 0.210 | Plastic | 1.669 | 19.5 | −9.84 |
| 5 | | 4.726 | (ASP) | 0.419 | | | | |
| 6 | Lens 3 | −8.744 | (ASP) | 0.340 | Plastic | 1.584 | 28.2 | −17.98 |
| 7 | | −52.912 | (ASP) | 0.127 | | | | |
| 8 | Stop | Plano | | 0.294 | | | | |
| 9 | Lens 4 | −6.713 | (ASP) | 0.288 | Plastic | 1.680 | 18.4 | 14.41 |
| 10 | | −4.053 | (ASP) | 0.030 | | | | |
| 11 | Lens 5 | −3.841 | (ASP) | 0.200 | Plastic | 1.544 | 56.0 | −7.37 |

TABLE 11-continued

6th Embodiment
f = 5.92 mm, Fno = 2.22, HFOV = 23.2 deg.

| Surface # | | Curvature Radius | | Thickness | Material | Index | Abbe # | Focal Length |
|---|---|---|---|---|---|---|---|---|
| 12 | | −93.785 | (ASP) | 1.139 | | | | |
| 13 | Lens 6 | −2.187 | (ASP) | 0.640 | Plastic | 1.544 | 56.0 | −14.39 |
| 14 | | −3.348 | (ASP) | 0.400 | | | | |
| 15 | IR-cut Filter | Plano | | 0.145 | Glass | 1.517 | 64.2 | — |
| 16 | | Plano | | 0.210 | | | | |
| 17 | Image | Plano | | 0.000 | | | | |

Note:
Reference wavelength is 587.6 nm (d-line).
An effective radius of the stop 601 (Surface 8) is 0.880 mm.

TABLE 12

Aspheric Coefficients

| Surface # | 2 | 3 | 4 | 5 | 6 | 7 |
|---|---|---|---|---|---|---|
| k = | −5.5346E−01 | 0.0000E+00 | 7.7988E+01 | −1.9410E+01 | 5.8624E+01 | 0.0000E+00 |
| A4 = | 6.7647E−03 | −4.4646E−01 | −3.5206E−01 | 7.6420E−02 | 1.4434E−01 | 8.0503E−02 |
| A6 = | 1.5810E−02 | 2.0598E+00 | 2.1109E+00 | 7.2412E−01 | 2.6034E−01 | −1.5027E−01 |
| A8 = | −4.5262E−02 | −5.0746E+00 | −5.4298E+00 | −2.8640E+00 | −1.8533E+00 | 1.1820E+00 |
| A10 = | 7.4664E−02 | 7.7239E+00 | 8.8004E+00 | 8.8411E+00 | 8.5717E+00 | −6.4546E+00 |
| A12 = | −6.7997E−02 | −7.6735E+00 | −9.7604E+00 | −1.9483E+01 | −2.4094E+01 | 1.9702E+01 |
| A14 = | 2.7871E−02 | 5.0170E+00 | 7.5756E+00 | 2.8772E+01 | 4.1861E+01 | −3.5793E+01 |
| A16 = | 1.9073E−04 | −2.0922E+00 | −3.9959E+00 | −2.6535E+01 | −4.3613E+01 | 3.8303E+01 |
| A18 = | −3.9512E−03 | 5.0675E−01 | 1.2889E+00 | 1.3740E+01 | 2.4974E+01 | −2.2182E+01 |
| A20 = | 9.1922E−04 | −5.4436E−02 | −1.9038E−01 | −3.0567E+00 | −6.0493E+00 | 5.3081E+00 |

| Surface # | 9 | 10 | 11 | 12 | 13 | 14 |
|---|---|---|---|---|---|---|
| k = | 0.0000E+00 | −2.8632E+01 | 7.6548E+00 | 0.0000E+00 | −6.8128E+00 | −5.9213E−02 |
| A4 = | −2.2298E−01 | −8.6777E−02 | 2.0680E+00 | 1.0900E−01 | −3.2678E−03 | 5.9695E−02 |
| A6 = | 6.3136E−01 | −1.6315E+00 | −2.7766E+00 | −4.8048E−01 | −5.3872E−02 | −8.4432E−02 |
| A8 = | −5.9297E+00 | 7.3673E+00 | 1.2584E+01 | 1.5132E+00 | 6.6976E−02 | 6.0275E−02 |
| A10 = | 2.7427E+01 | −1.6548E+01 | −3.0095E+01 | −2.8083E+00 | −3.9250E−02 | −2.9425E−02 |
| A12 = | −7.9881E+01 | 2.0655E+01 | 4.3345E+01 | 3.1009E+00 | 1.3744E−02 | 1.0048E−02 |
| A14 = | 1.4528E+02 | −1.5017E+01 | −4.0302E+01 | −2.1056E+00 | −2.8877E−03 | −2.3756E−03 |
| A16 = | −1.6144E+02 | 6.5680E+00 | 2.4526E+01 | 8.6430E−01 | 3.2901E−04 | 3.6811E−04 |
| A18 = | 1.0032E+02 | −1.9159E+00 | −9.1551E+00 | −1.9664E−01 | −1.4063E−05 | −3.3117E−05 |
| A20 = | −2.6553E+01 | 3.9621E−01 | 1.5927E+00 | 1.8988E−02 | −2.5080E−07 | 1.3123E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.92 | T23/BL | 0.55 |
| Fno | 2.22 | ΣAT/(T23 + T56) | 1.30 |
| HFOV [deg.] | 23.2 | TD/BL | 6.29 |
| V2 + V3 + V4 | 66.1 | TL/f | 0.93 |
| V32 | 3 | f/R12 | −1.77 |
| V24 | 2 | |f1/f2| | 0.31 |
| CT1/(CT2 + CT3 + CT4 + CT5) | 1.00 | |f1/f3| | 0.17 |
| CT1/CT6 | 1.62 | |f1/f4| | 0.21 |
| T23/T34 | 1.00 | |f1/f5| | 0.41 |
| T23/T45 | 13.97 | |f1/f6| | 0.21 |
| T23/(T34 + T45) | 0.93 | f2/f3 | 0.55 |

7th Embodiment

Figure 13:
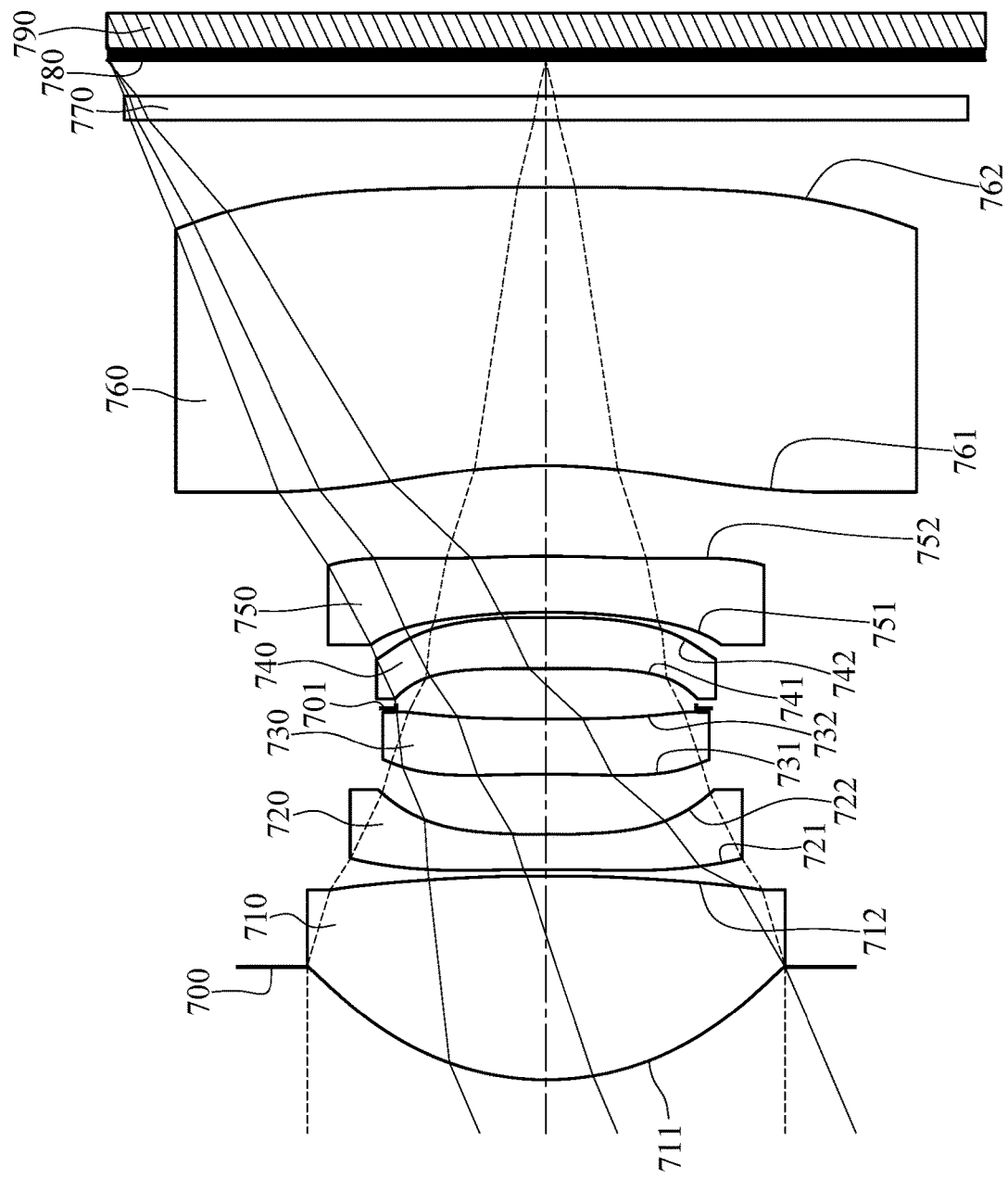
FIG. 13 is a schematic view of an image capturing unit according to the 7th embodiment of the present disclosure.
Figure 14:
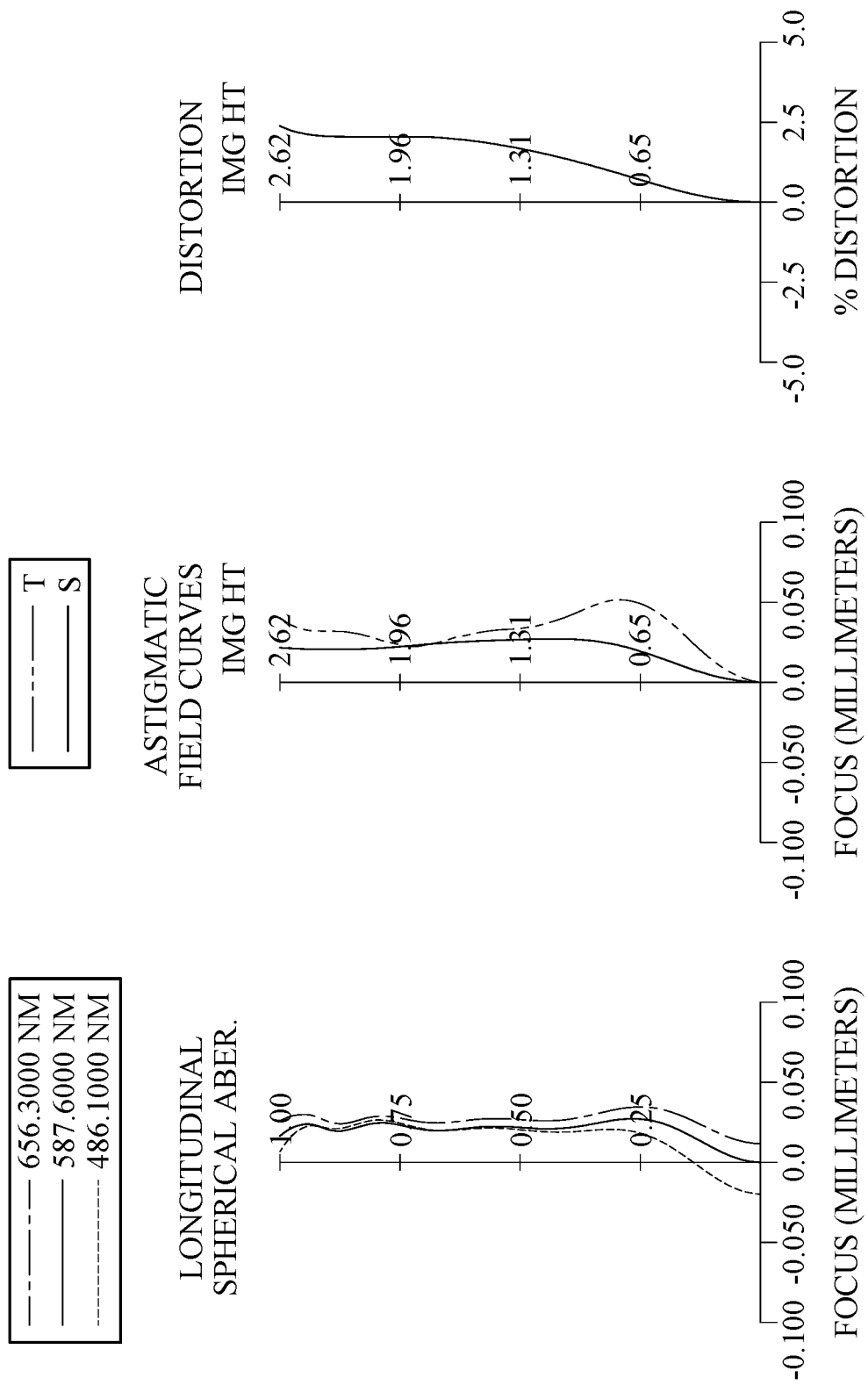
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging optical lens assembly (its reference numeral is omitted) of the present disclosure and an image sensor 790. The imaging optical lens assembly includes, in order from an object side to an image side, an aperture stop 700, a first lens element 710, a second lens element 720, a third lens element 730, a stop 701, a fourth lens element 740, a fifth lens element 750, a sixth lens element 760, an IR-cut filter 770 and an image surface 780. The imaging optical lens assembly includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric.

The second lens element 720 with negative refractive power has an object-side surface 721 being concave in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one inflection point. The image-side surface 752 of the fifth lens element 750 has at least one critical point in an off-axis region thereof.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one inflection point. The image-side surface 762 of the sixth lens element 760 has at least one inflection point.

The IR-cut filter 770 is made of glass material and located between the sixth lens element 760 and the image surface 780, and will not affect the focal length of the imaging optical lens assembly. The image sensor 790 is disposed on or near the image surface 780 of the imaging optical lens assembly.

The detailed optical data of the 7th embodiment are shown in Table 13 and the aspheric surface data are shown in Table 14 below.

TABLE 13

7th Embodiment
f = 5.93 mm, Fno = 2.07, HFOV = 23.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.681 | | | | |
| 2 | Lens 1 | 1.689 | (ASP) | 1.226 | Plastic | 1.545 | 56.1 | 2.97 |
| 3 | | −27.677 | (ASP) | 0.038 | | | | |
| 4 | Lens 2 | −34.761 | (ASP) | 0.210 | Plastic | 1.634 | 23.8 | −9.18 |
| 5 | | 7.005 | (ASP) | 0.361 | | | | |
| 6 | Lens 3 | −8.578 | (ASP) | 0.335 | Plastic | 1.607 | 26.6 | −8.87 |
| 7 | | 14.697 | (ASP) | 0.065 | | | | |
| 8 | Stop | Plano | | 0.237 | | | | |
| 9 | Lens 4 | 42.907 | (ASP) | 0.306 | Plastic | 1.686 | 18.4 | 13.53 |
| 10 | | −11.810 | (ASP) | 0.031 | | | | |
| 11 | Lens 5 | −4.900 | (ASP) | 0.337 | Plastic | 1.607 | 26.6 | −39.33 |
| 12 | | −6.324 | (ASP) | 0.544 | | | | |
| 13 | Lens 6 | −3.517 | (ASP) | 1.674 | Plastic | 1.582 | 30.2 | −6.94 |
| 14 | | −31.927 | (ASP) | 0.400 | | | | |
| 15 | IR-cut Filter | Plano | | 0.145 | Glass | 1.517 | 64.2 | — |
| 16 | | Plano | | 0.214 | | | | |
| 17 | Image | Plano | | 0.000 | | | | |

Note:
Reference wavelength is 587.6 nm (d-line).
An effective radius of the stop 701 (Surface 8) is 0.900 mm.

TABLE 14

Aspheric Coefficients

| Surface # | 2 | 3 | 4 | 5 | 6 | 7 |
|---|---|---|---|---|---|---|
| k = | −4.9742E−01 | 0.0000E+00 | 9.0000E+01 | −4.3338E+01 | 5.6760E+01 | 0.0000E+00 |
| A4 = | 7.8628E−03 | −2.6140E−01 | −2.0087E−01 | 1.0069E−01 | 9.1143E−02 | 2.0464E−02 |
| A6 = | 4.5480E−04 | 1.0101E+00 | 1.2151E+00 | 4.1158E−01 | 5.5241E−01 | −7.5980E−02 |
| A8 = | 3.4106E−03 | −2.2177E+00 | −2.8046E+00 | −8.1342E−01 | −2.9278E+00 | 1.9569E+00 |
| A10 = | −1.0497E−02 | 3.0896E+00 | 3.9490E+00 | 9.0364E−01 | 1.1252E+01 | −1.0668E+01 |
| A12 = | 1.7469E−02 | −2.8407E+00 | −3.6388E+00 | −6.2371E−01 | −2.8421E+01 | 3.0968E+01 |
| A14 = | −1.7636E−02 | 1.7226E+00 | 2.2016E+00 | 7.3535E−01 | 4.5879E+01 | −5.4156E+01 |
| A16 = | 1.0139E−02 | −6.6430E−01 | −8.4428E−01 | −1.2226E+00 | −4.5366E+01 | 5.6618E+01 |
| A18 = | −3.1212E−03 | 1.4782E−01 | 1.8751E−01 | 1.0467E+00 | 2.5010E+01 | −3.2516E+01 |
| A20 = | 3.9278E−04 | −1.4452E−02 | −1.8607E−02 | −3.3728E−01 | −5.8959E+00 | 7.8157E+00 |

TABLE 14-continued

| Aspheric Coefficients | | | | | | |
|---|---|---|---|---|---|---|
| Surface # | 9 | 10 | 11 | 12 | 13 | 14 |
| k = | 0.0000E+00 | −6.5630E+01 | 6.7550E−01 | 0.0000E+00 | −2.8926E+01 | −9.0000E+01 |
| A4 = | −2.8729E−01 | −2.7338E−01 | 3.3677E−02 | 1.7105E−01 | −2.6094E−02 | 7.5789E−03 |
| A6 = | 3.8210E−01 | −9.7616E−01 | −1.5065E+00 | −2.0683E−01 | 4.5868E−02 | −1.3816E−02 |
| A8 = | −1.3642E+00 | 7.3711E+00 | 8.6743E+00 | 2.3132E−01 | −5.3590E−02 | 7.3625E−03 |
| A10 = | 4.7437E+00 | −2.1917E+01 | −2.4339E+01 | −2.2434E−01 | 6.1085E−02 | −3.0506E−03 |
| A12 = | −1.3311E+01 | 3.7266E+01 | 4.0058E+01 | 1.2149E−01 | −4.7114E−02 | 9.4560E−04 |
| A14 = | 2.3622E+01 | −3.9952E+01 | −4.1466E+01 | −2.0934E−02 | 2.2140E−02 | −2.0309E−04 |
| A16 = | −2.5739E+01 | 2.6975E+01 | 2.6809E+01 | −9.6684E−03 | −6.1583E−03 | 2.8034E−05 |
| A18 = | 1.5619E+01 | −1.0513E+01 | −9.9130E+00 | 4.8072E−03 | 9.3684E−04 | −2.2194E−06 |
| A20 = | −3.9801E+00 | 1.8186E+00 | 1.5923E+00 | −5.6779E−04 | −6.0137E−05 | 7.7338E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.93 | T23/BL | 0.48 |
| Fno | 2.07 | ΣAT/(T23 + T56) | 1.41 |
| HFOV [deg.] | 23.2 | TD/BL | 7.06 |
| V2 + V3 + V4 | 68.9 | TL/f | 1.03 |
| V32 | 5 | f/R12 | −0.19 |
| V24 | 2 | |f1/f2| | 0.32 |
| CT1/(CT2 + CT3 + CT4 + CT5) | 1.03 | |f1/f3| | 0.33 |
| CT1/CT6 | 0.73 | |f1/f4| | 0.22 |
| T23/T34 | 1.20 | |f1/f5| | 0.08 |
| T23/T45 | 11.65 | |f1/f6| | 0.43 |
| T23/(T34 + T45) | 1.08 | f2/f3 | 1.03 |

8th Embodiment

Figure 15:
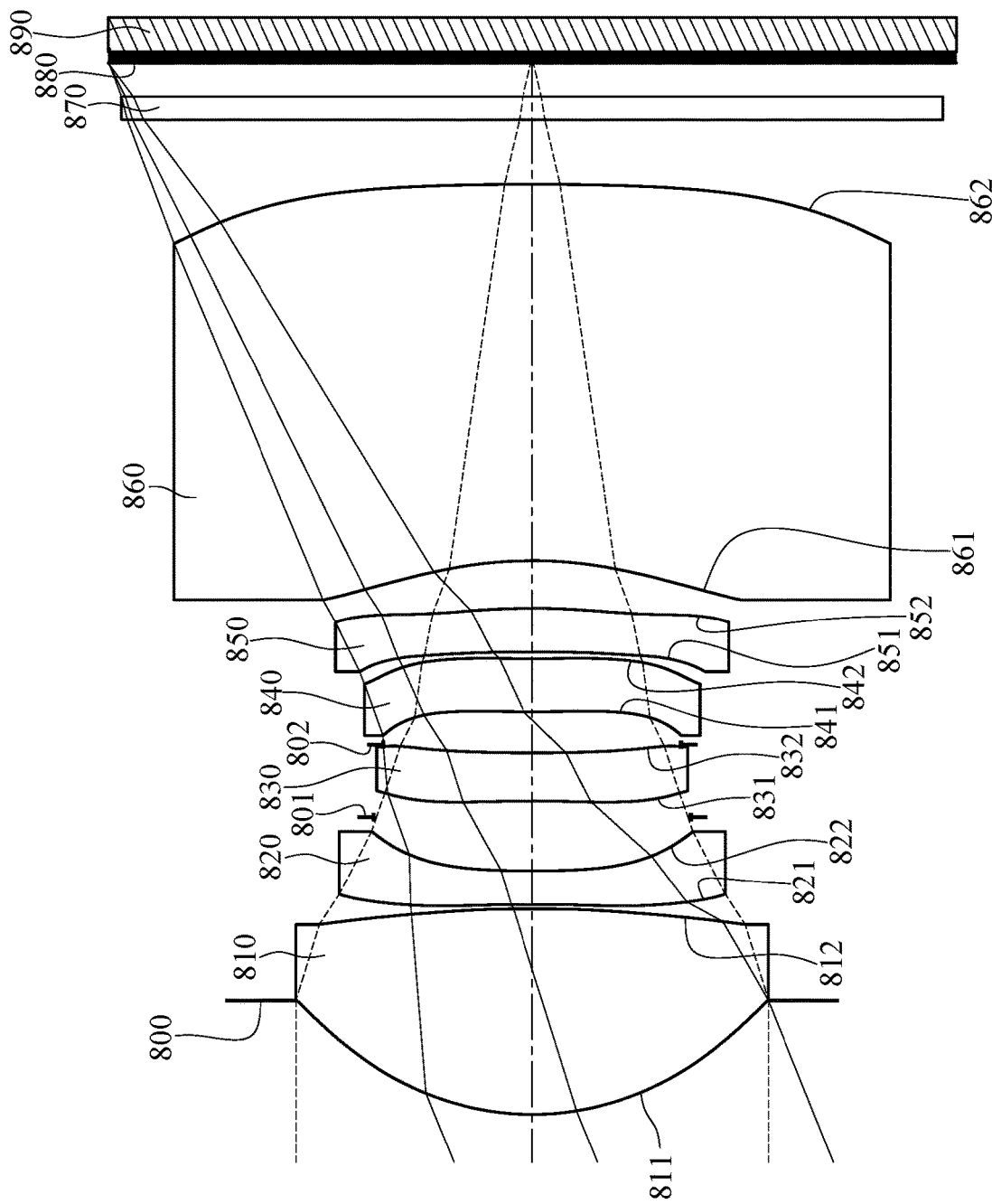
FIG. 15 is a schematic view of an image capturing unit according to the 8th embodiment of the present disclosure.
Figure 16:
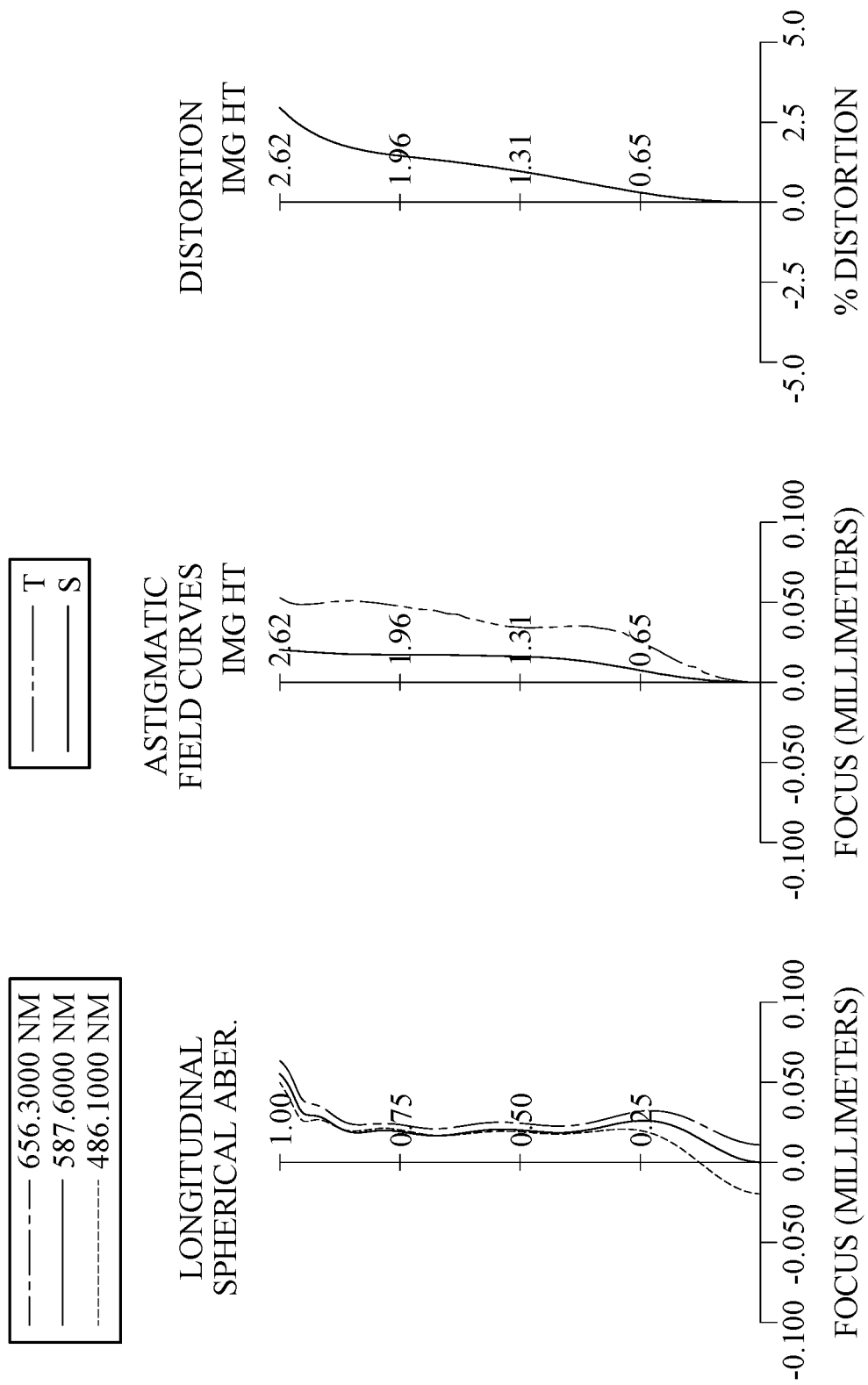
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging optical lens assembly (its reference numeral is omitted) of the present disclosure and an image sensor 890. The imaging optical lens assembly includes, in order from an object side to an image side, an aperture stop 800, a first lens element 810, a second lens element 820, a stop 801, a third lens element 830, a stop 802, a fourth lens element 840, a fifth lens element 850, a sixth lens element 860, an IR-cut filter 870 and an image surface 880. The imaging optical lens assembly includes six lens elements (810, 820, 830, 840, 850 and 860) with no additional lens element disposed between each of the adjacent six lens elements.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being concave in a paraxial region thereof and an image-side surface 832 being concave in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The image-side surface 852 of the fifth lens element 850 has at least one inflection point.

The sixth lens element 860 with negative refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 862 of the sixth lens element 860 has at least one inflection point.

The IR-cut filter 870 is made of glass material and located between the sixth lens element 860 and the image surface 880, and will not affect the focal length of the imaging optical lens assembly. The image sensor 890 is disposed on or near the image surface 880 of the imaging optical lens assembly.

The detailed optical data of the 8th embodiment are shown in Table 15 and the aspheric surface data are shown in Table 16 below.

TABLE 15

8th Embodiment
f = 6.27 mm, Fno = 2.15, HFOV = 22.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.703 |  |  |  |  |
| 2 | Lens 1 | 1.715 | (ASP) | 1.269 | Plastic | 1.544 | 56.0 | 2.95 |
| 3 |  | −18.039 | (ASP) | 0.027 |  |  |  |  |
| 4 | Lens 2 | −20.154 | (ASP) | 0.210 | Plastic | 1.614 | 26.0 | −8.84 |
| 5 |  | 7.450 | (ASP) | 0.332 |  |  |  |  |
| 6 | Stop | Plano |  | 0.100 |  |  |  |  |
| 7 | Lens 3 | −7.167 | (ASP) | 0.297 | Plastic | 1.603 | 28.5 | −7.78 |
| 8 |  | 13.775 | (ASP) | 0.051 |  |  |  |  |
| 9 | Stop | Plano |  | 0.202 |  |  |  |  |
| 10 | Lens 4 | 9.021 | (ASP) | 0.328 | Plastic | 1.686 | 18.4 | −133.47 |
| 11 |  | 8.090 | (ASP) | 0.043 |  |  |  |  |
| 12 | Lens 5 | −17.679 | (ASP) | 0.270 | Plastic | 1.614 | 26.0 | 8.46 |
| 13 |  | −4.035 | (ASP) | 0.295 |  |  |  |  |
| 14 | Lens 6 | −2.521 | (ASP) | 2.326 | Plastic | 1.582 | 30.2 | −5.08 |
| 15 |  | −22.715 | (ASP) | 0.400 |  |  |  |  |
| 16 | IR-cut Filter | Plano |  | 0.145 | Glass | 1.517 | 64.2 | — |
| 17 |  | Plano |  | 0.208 |  |  |  |  |
| 18 | Image | Plano |  | 0.000 |  |  |  |  |

Note:
Reference wavelength is 587.6 nm (d-line).
An effective radius of the stop 801 (Surface 6) is 0.980 mm.
An effective radius of the stop 802 (Surface 9) is 0.920 mm.

TABLE 16

Aspheric Coefficients

| Surface # | 2 | 3 | 4 | 5 | 7 | 8 |
|---|---|---|---|---|---|---|
| k = | −4.8680E−01 | 0.0000E+00 | 8.1034E+00 | −3.0000E+01 | 2.6181E+01 | 0.0000E+00 |
| A4 = | 5.0463E−03 | −3.8453E−01 | −2.9223E−01 | 1.4281E−01 | 1.5909E−01 | 3.5026E−02 |
| A6 = | 1.3604E−02 | 1.7219E+00 | 1.8586E+00 | 2.6232E−01 | 2.4267E−01 | 5.9908E−02 |
| A8 = | −3.8058E−02 | −4.1981E+00 | −4.7191E+00 | −2.5862E−01 | −1.4473E+00 | 7.8708E−01 |
| A10 = | 6.8631E−02 | 6.3453E+00 | 7.0533E+00 | −1.3586E+00 | 5.1913E+00 | −6.3569E+00 |
| A12 = | −7.5375E−02 | −6.2073E+00 | −6.6015E+00 | 4.9192E+00 | −1.2705E+01 | 2.0912E+01 |
| A14 = | 5.0284E−02 | 3.9420E+00 | 3.8549E+00 | −7.3741E+00 | 2.0736E+01 | −3.8870E+01 |
| A16 = | −1.9991E−02 | −1.5708E+00 | −1.3256E+00 | 5.8989E+00 | −2.1240E+01 | 4.2267E+01 |
| A18 = | 4.2947E−03 | 3.5708E−01 | 2.3102E−01 | −2.4366E+00 | 1.2267E+01 | −2.5171E+01 |
| A20 = | −3.8163E−04 | −3.5335E−02 | −1.3008E−02 | 3.9624E−01 | −3.0528E+00 | 6.3029E+00 |

| Surface # | 10 | 11 | 12 | 13 | 14 | 15 |
|---|---|---|---|---|---|---|
| k = | 0.0000E+00 | 1.1068E+01 | −6.7462E+01 | 0.0000E+00 | −1.1684E+01 | 4.8310E+01 |
| A4 = | −2.8672E−01 | −4.5562E−01 | −2.4030E−01 | 7.3682E−02 | −6.1262E−02 | −8.1359E−03 |
| A6 = | 3.7674E−01 | 5.5544E−01 | 3.6753E−01 | 1.8614E−01 | 8.3619E−02 | −5.0493E−04 |
| A8 = | −7.2540E−01 | 1.5657E+00 | 2.5223E+00 | −4.6806E−01 | −7.3976E−02 | −5.6752E−04 |
| A10 = | 4.0718E−03 | −9.7191E+00 | −1.2508E+01 | 8.6185E−01 | 1.9992E−02 | 4.5462E−04 |
| A12 = | 2.2239E+00 | 2.1336E+01 | 2.6116E+01 | −1.3078E+00 | 1.0871E−01 | −1.9367E−04 |
| A14 = | −4.6241E+00 | −2.6076E+01 | −3.1427E+01 | 1.2117E+00 | −1.9676E−01 | 5.2587E−05 |
| A16 = | 4.7523E+00 | 1.8707E+01 | 2.2488E+01 | −6.2539E−01 | 1.4658E−01 | −8.7009E−06 |
| A18 = | −2.8460E+00 | −7.3430E+00 | −8.8421E+00 | 1.6523E−01 | −5.1485E−02 | 8.0126E−07 |
| A20 = | 8.4938E−01 | 1.2234E+00 | 1.4617E+00 | −1.7329E−02 | 7.0103E−03 | −3.0483E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 6.27 | T23/BL | 0.57 |
| Fno | 2.15 | ΣAT/(T23 + T56) | 1.44 |
| HFOV [deg.] | 22.0 | TD/BL | 7.64 |
| V2 + V3 + V4 | 72.9 | TL/f | 1.04 |
| V32 | 5 | f/R12 | −0.28 |
| V24 | 1 | |f1/f2| | 0.33 |
| CT1/(CT2 + CT3 + CT4 + CT5) | 1.15 | |f1/f3| | 0.38 |
| CT1/CT6 | 0.55 | |f1/f4| | 0.02 |

-continued

| 8th Embodiment | | | |
|---|---|---|---|
| T23/T34 | 1.71 | \|f1/f5\| | 0.35 |
| T23/T45 | 10.05 | \|f1/f6\| | 0.58 |
| T23/(T34 + T45) | 1.46 | f2/f3 | 1.14 |

9th Embodiment

Figure 17:
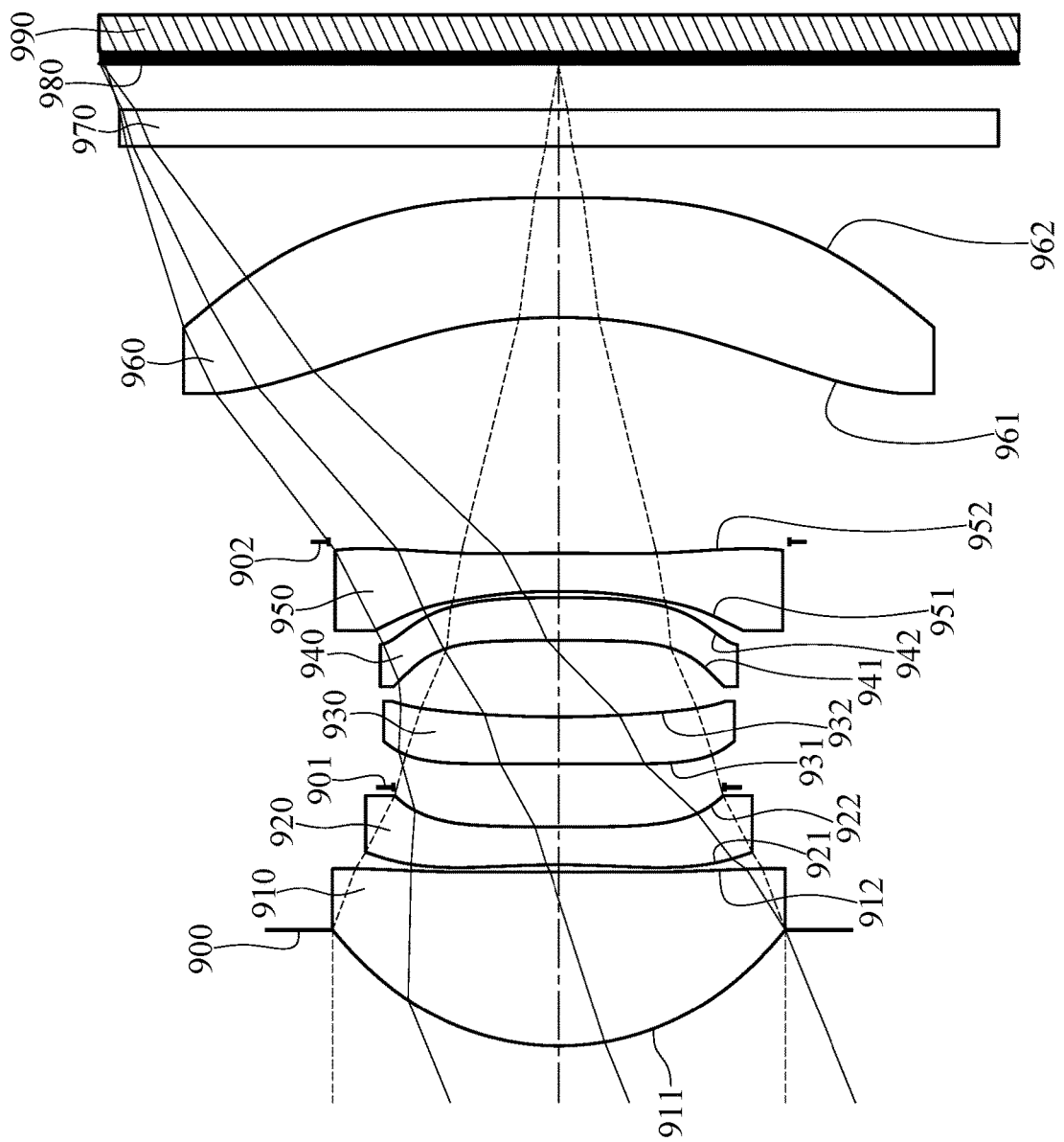
FIG. 17 is a schematic view of an image capturing unit according to the 9th embodiment of the present disclosure.
Figure 18:
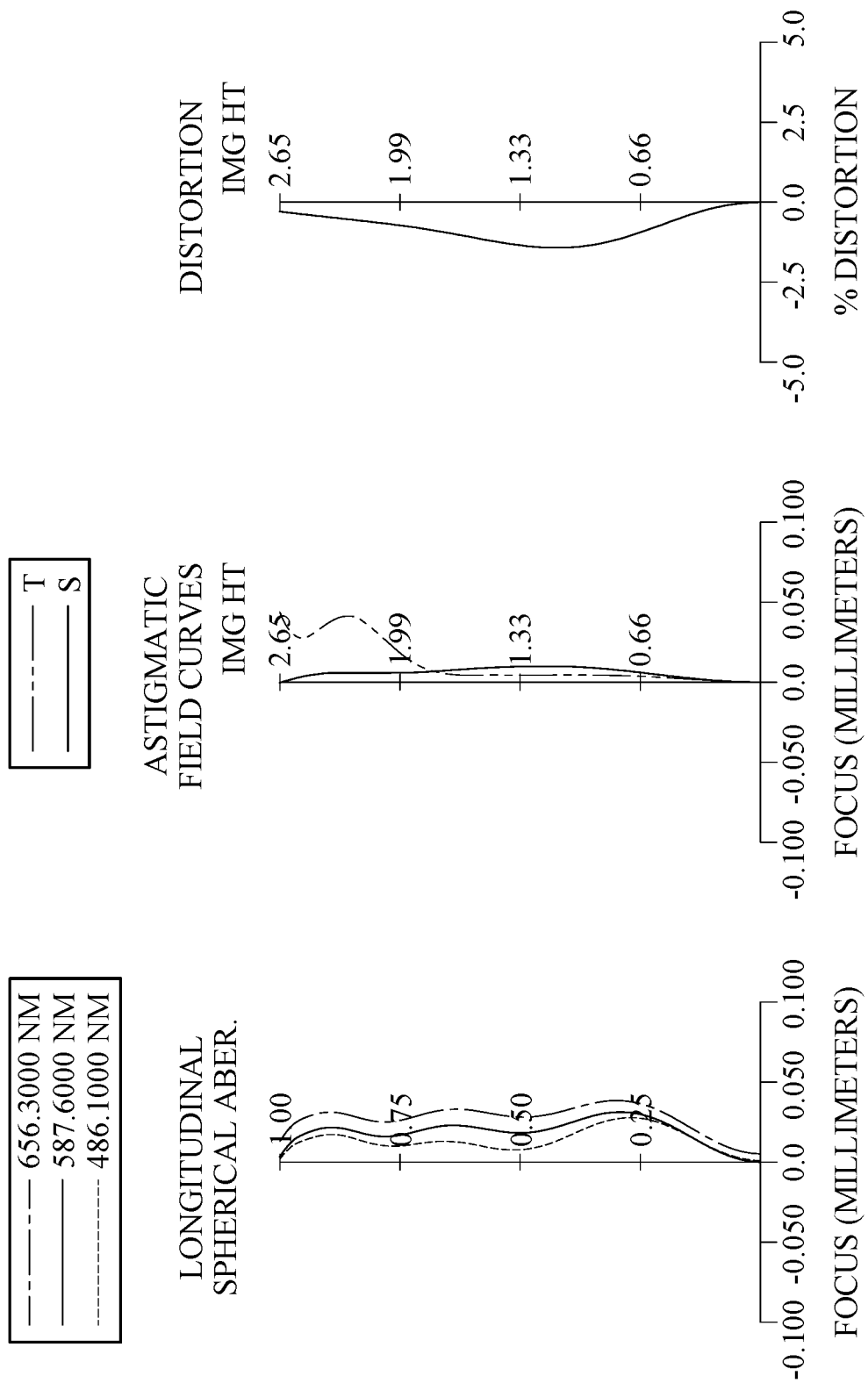
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging optical lens assembly (its reference numeral is omitted) of the present disclosure and an image sensor 990. The imaging optical lens assembly includes, in order from an object side to an image side, an aperture stop 900, a first lens element 910, a second lens element 920, a stop 901, a third lens element 930, a fourth lens element 940, a fifth lens element 950, a stop 902, a sixth lens element 960, an IR-cut filter 970 and an image surface 980. The imaging optical lens assembly includes six lens elements (910, 920, 930, 940, 950 and 960) with no additional lens element disposed between each of the adjacent six lens elements.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being concave in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The image-side surface 952 of the fifth lens element 950 has at least one inflection point. The image-side surface 952 of the fifth lens element 950 has at least one critical point in an off-axis region thereof.

The sixth lens element 960 with negative refractive power has an object-side surface 961 being concave in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one inflection point.

The IR-cut filter 970 is made of glass material and located between the sixth lens element 960 and the image surface 980, and will not affect the focal length of the imaging optical lens assembly. The image sensor 990 is disposed on or near the image surface 980 of the imaging optical lens assembly.

The detailed optical data of the 9th embodiment are shown in Table 17 and the aspheric surface data are shown in Table 18 below.

TABLE 17

9th Embodiment
f = 6.48 mm, Fno = 2.48, HFOV = 22.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.672 | | | | |
| 2 | Lens 1 | 1.537 | (ASP) | 1.008 | Plastic | 1.545 | 56.1 | 2.71 |
| 3 | | −29.304 | (ASP) | 0.041 | | | | |
| 4 | Lens 2 | −4.916 | (ASP) | 0.220 | Plastic | 1.671 | 19.5 | −7.72 |
| 5 | | −97.912 | (ASP) | 0.227 | | | | |
| 6 | Stop | Plano | | 0.136 | | | | |
| 7 | Lens 3 | −102.432 | (ASP) | 0.273 | Plastic | 1.614 | 26.0 | −8.74 |
| 8 | | 5.665 | (ASP) | 0.442 | | | | |
| 9 | Lens 4 | 38.733 | (ASP) | 0.247 | Plastic | 1.671 | 19.5 | 30.41 |
| 10 | | −42.982 | (ASP) | 0.037 | | | | |
| 11 | Lens 5 | −4.730 | (ASP) | 0.220 | Plastic | 1.544 | 56.0 | −11.50 |
| 12 | | −19.705 | (ASP) | 0.065 | | | | |
| 13 | Stop | Plano | | 1.298 | | | | |
| 14 | Lens 6 | −3.202 | (ASP) | 0.692 | Plastic | 1.534 | 55.9 | −7.08 |
| 15 | | −22.511 | (ASP) | 0.300 | | | | |
| 16 | IR-cut Filter | Plano | | 0.210 | Glass | 1.517 | 64.2 | — |
| 17 | | Plano | | 0.267 | | | | |
| 18 | Image | Plano | | 0.000 | | | | |

Note:
Reference wavelength is 587.6 nm (d-line).
An effective radius of the stop 901 (Surface 6) is 0.955 mm.
An effective radius of the stop 902 (Surface 13) is 1.330 mm.

TABLE 18

Aspheric Coefficients

| Surface # | 2 | 3 | 4 | 5 | 7 | 8 |
|---|---|---|---|---|---|---|
| k = | −2.9164E−01 | 8.3692E+01 | −7.7102E+01 | −9.0000E+01 | −9.0000E+01 | 2.4664E+01 |
| A4 = | 4.0516E−03 | 5.3215E−02 | 1.1665E−01 | 2.0745E−01 | 1.0296E−02 | −8.1816E−02 |
| A6 = | 6.1634E−03 | −1.8975E−02 | −3.3815E−02 | −2.1932E−01 | 1.2025E−02 | 5.5107E−02 |
| A8 = | −2.8128E−03 | −1.4952E−02 | 2.1519E−02 | 7.0891E−01 | 2.7302E−01 | 7.3365E−02 |
| A10 = | 1.2961E−03 | 1.4855E−02 | 6.6184E−03 | −1.1678E+00 | −3.7486E−01 | −1.1265E−01 |
| A12 = | −7.9198E−04 | −4.1133E−03 | −9.5243E−03 | 1.1659E+00 | 2.9231E−01 | 3.8808E−02 |
| A14 = | — | — | — | −4.5765E−01 | −8.7248E−02 | 1.1824E−02 |

| Surface # | 9 | 10 | 11 | 12 | 14 | 15 |
|---|---|---|---|---|---|---|
| k = | 9.0000E+01 | 5.3222E+01 | −3.9508E+00 | −6.4547E+01 | −1.3446E+01 | −9.0000E+01 |
| A4 = | −3.0347E−01 | −6.2887E−01 | −5.3393E−01 | 2.9783E−03 | −1.0046E−01 | −1.2211E−01 |
| A6 = | 6.9209E−01 | 1.7611E+00 | 2.0617E+00 | 4.9427E−01 | 8.0823E−02 | 7.6876E−02 |
| A8 = | −4.4729E+00 | −4.2732E+00 | −3.1536E+00 | −1.1798E+00 | −2.8968E−02 | −3.5692E−02 |
| A10 = | 1.3362E+01 | 6.8632E+00 | 8.9897E−01 | 1.2897E+00 | 1.8585E−03 | 1.2090E−02 |
| A12 = | −2.1487E+01 | −7.8195E+00 | 2.0998E+00 | −7.7264E−01 | 2.4678E−03 | −3.0336E−03 |
| A14 = | 1.7068E+01 | 5.2906E+00 | −1.9803E+00 | 2.4623E−01 | −9.3112E−04 | 5.1117E−04 |
| A16 = | −5.1829E+00 | −1.4442E+00 | 5.1497E−01 | −3.2922E−02 | 1.3780E−02 | −4.8898E−05 |
| A18 = | — | — | — | — | −7.6699E−06 | 1.9552E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 6.48 | T23/BL | 0.47 |
| Fno | 2.48 | ΣAT/(T23 + T56) | 1.30 |
| HFOV [deg.] | 22.2 | TD/BL | 6.31 |
| V2 + V3 + V4 | 64.9 | TL/f | 0.88 |
| V32 | 3 | f/R12 | −0.29 |
| V24 | 2 | |f1/f2| | 0.35 |
| CT1/(CT2 + CT3 + CT4 + CT5) | 1.05 | |f1/f3| | 0.31 |
| CT1/CT6 | 1.46 | |f1/f4| | 0.09 |
| T23/T34 | 0.82 | |f1/f5| | 0.24 |
| T23/T45 | 9.81 | |f1/f6| | 0.38 |
| T23/(T34 + T45) | 0.76 | f2/f3 | 0.88 |

10th Embodiment

Figure 19:
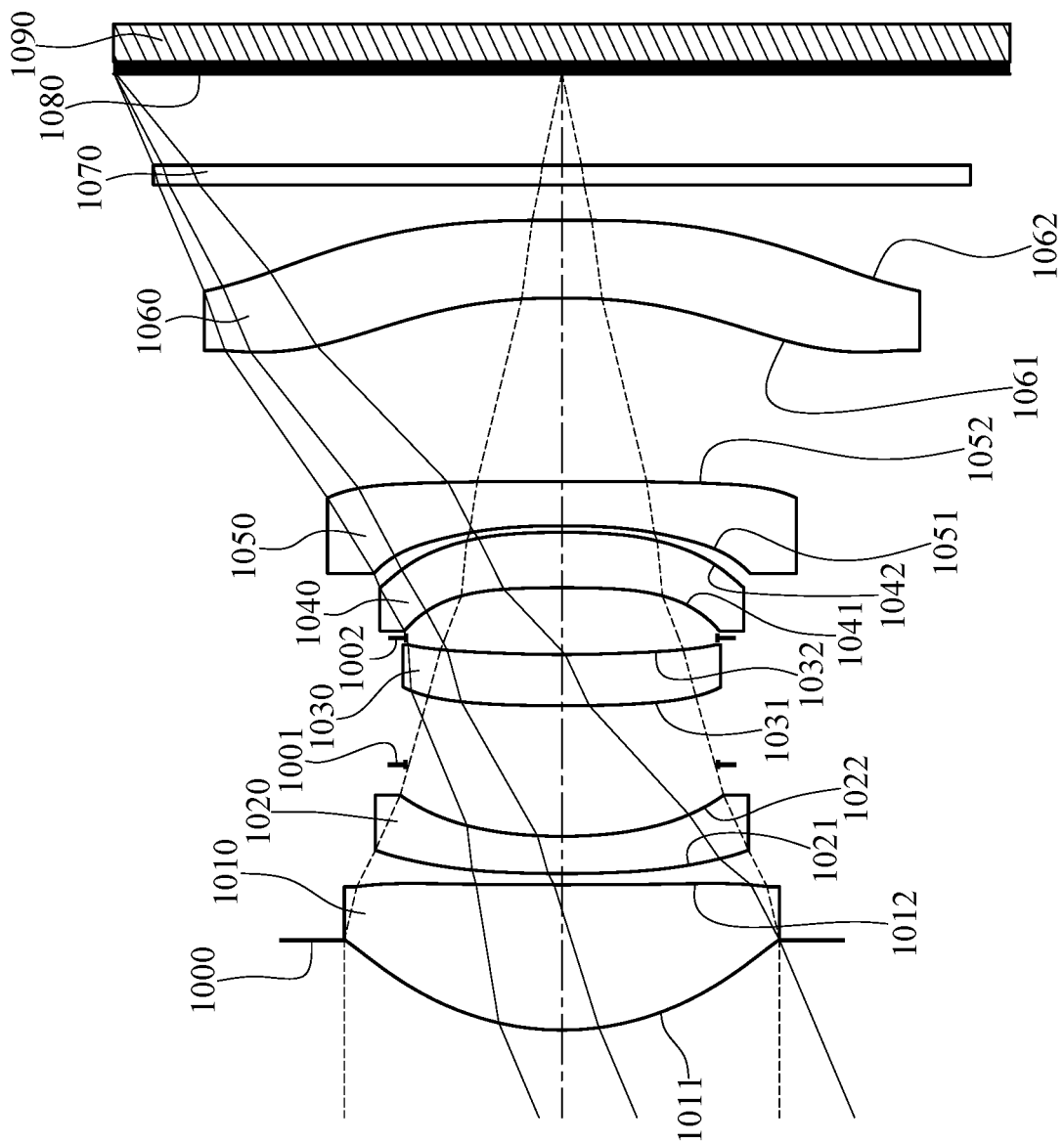
FIG. 19 is a schematic view of an image capturing unit according to the 10th embodiment of the present disclosure.
Figure 20:
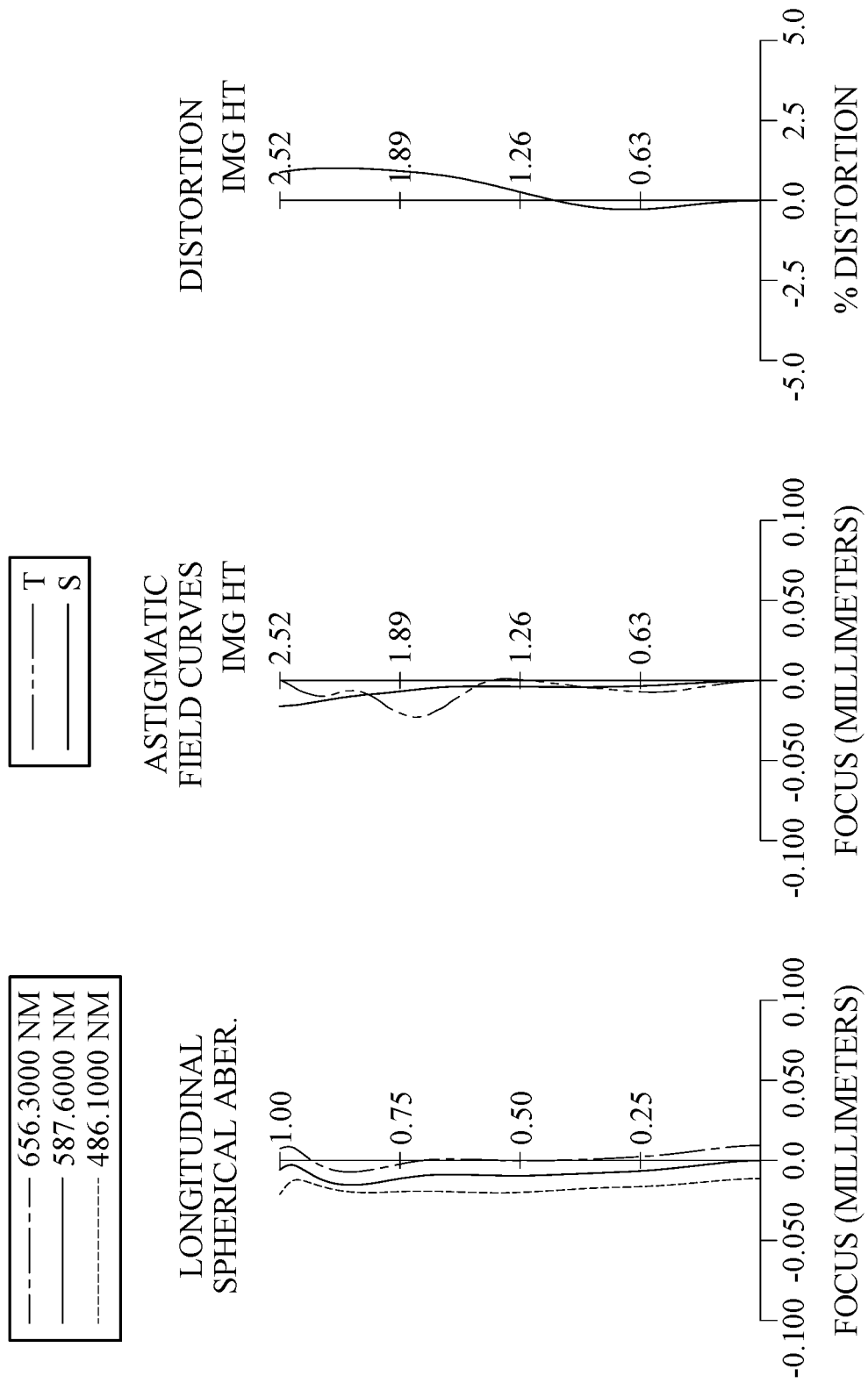
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging optical lens assembly (its reference numeral is omitted) of the present disclosure and an image sensor 1090. The imaging optical lens assembly includes, in order from an object side to an image side, an aperture stop 1000, a first lens element 1010, a second lens element 1020, a stop 1001, a third lens element 1030, a stop 1002, a fourth lens element 1040, a fifth lens element 1050, a sixth lens element 1060, an IR-cut filter 1070 and an image surface 1080. The imaging optical lens assembly includes six lens elements (1010, 1020, 1030, 1040, 1050 and 1060) with no additional lens element disposed between each of the adjacent six lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one inflection point.

The sixth lens element 1060 with negative refractive power has an object-side surface 1061 being concave in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has at least one inflection point. The image-side surface 1062 of the sixth lens element 1060 has at least one inflection point. The object-side surface 1061 of the sixth lens element 1060 has at least one critical point in an off-axis region thereof.

The IR-cut filter 1070 is made of glass material and located between the sixth lens element 1060 and the image surface 1080, and will not affect the focal length of the imaging optical lens assembly. The image sensor 1090 is disposed on or near the image surface 1080 of the imaging optical lens assembly.

The detailed optical data of the 10th embodiment are shown in Table 19 and the aspheric surface data are shown in Table 20 below.

TABLE 19

10th Embodiment
f = 5.93 mm, Fno = 2.42, HFOV = 22.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.507 | | | | |
| 2 | Lens 1 | 1.576 | (ASP) | 0.819 | Plastic | 1.545 | 56.1 | 2.97 |
| 3 | | 48.950 | (ASP) | 0.063 | | | | |
| 4 | Lens 2 | 7.928 | (ASP) | 0.210 | Plastic | 1.669 | 19.5 | −6.32 |
| 5 | | 2.729 | (ASP) | 0.404 | | | | |
| 6 | Stop | Plano | | 0.332 | | | | |
| 7 | Lens 3 | 9.016 | (ASP) | 0.289 | Plastic | 1.614 | 26.0 | −73.16 |
| 8 | | 7.417 | (ASP) | 0.094 | | | | |
| 9 | Stop | Plano | | 0.283 | | | | |
| 10 | Lens 4 | −8.434 | (ASP) | 0.312 | Plastic | 1.669 | 19.5 | 14.36 |
| 11 | | −4.558 | (ASP) | 0.037 | | | | |
| 12 | Lens 5 | −4.472 | (ASP) | 0.250 | Plastic | 1.544 | 56.0 | −7.92 |
| 13 | | 120.539 | (ASP) | 1.034 | | | | |
| 14 | Lens 6 | −4.036 | (ASP) | 0.438 | Plastic | 1.534 | 55.9 | −8.65 |
| 15 | | −33.233 | (ASP) | 0.200 | | | | |
| 16 | IR-cut Filter | Plano | | 0.110 | Glass | 1.517 | 64.2 | — |
| 17 | | Plano | | 0.514 | | | | |
| 18 | Image | Plano | | 0.000 | | | | |

Note:
Reference wavelength is 587.6 nm (d-line).
An effective radius of the stop 1001 (Surface 6) is 0.880 mm.
An effective radius of the stop 1002 (Surface 9) is 0.877 mm.

TABLE 20

Aspheric Coefficients

| Surface # | 2 | 3 | 4 | 5 | 7 | 8 |
|---|---|---|---|---|---|---|
| k = | −6.1587E−01 | 0.0000E+00 | 1.0580E+01 | −3.5823E+01 | −8.6798E+01 | 0.0000E+00 |
| A4 = | 8.7832E−03 | −1.7324E−02 | 2.7601E−02 | 2.8511E−01 | 2.6972E−02 | −7.6178E−02 |
| A6 = | 1.5396E−02 | 1.4293E−01 | 1.8927E−01 | −2.6889E−01 | 9.8922E−02 | 1.6273E−01 |
| A8 = | −3.3636E−02 | −3.2052E−01 | −3.9898E−01 | 4.9030E−01 | 6.0609E−03 | −1.9093E−01 |
| A10 = | 4.4192E−02 | 3.1904E−01 | 3.3405E−01 | −7.1378E−01 | −3.9805E−02 | 4.1251E−01 |
| A12 = | −3.5104E−02 | −1.7591E−01 | −1.1768E−01 | 6.0796E−01 | 6.8984E−03 | −5.5276E−01 |
| A14 = | 1.3537E−02 | 5.2703E−02 | 1.3970E−02 | −1.9977E−01 | 3.9364E−02 | 2.9560E−01 |
| A16 = | −2.5709E−03 | −7.0781E−03 | — | — | — | — |

| Surface # | 10 | 11 | 12 | 13 | 14 | 15 |
|---|---|---|---|---|---|---|
| k = | 0.0000E+00 | −3.8778E+01 | 4.5669E−01 | 0.0000E+00 | −3.7736E+00 | −5.7028E+00 |
| A4 = | −2.2528E−01 | −1.1284E−01 | −1.4494E−02 | −8.9235E−02 | −1.3975E−01 | −1.5900E−01 |
| A6 = | −2.5074E−01 | −1.2537E+00 | −1.2908E+00 | 1.5938E−01 | 1.9169E−01 | 1.6732E−01 |
| A8 = | 5.6974E−01 | 4.5969E+00 | 5.1854E+00 | −1.3671E−01 | −1.6787E−01 | −1.2990E−01 |
| A10 = | −8.8549E−01 | −7.9565E+00 | −9.2551E+00 | 4.7674E−02 | 1.0691E−01 | 7.1650E−02 |
| A12 = | 9.7639E−01 | 7.4001E+00 | 8.5952E+00 | −4.0466E−03 | −4.5116E−02 | −2.7818E−02 |
| A14 = | −1.1174E+00 | −3.6829E+00 | −4.1317E+00 | −2.0747E−03 | 1.2207E−02 | 7.4722E−03 |
| A16 = | 6.1276E−01 | 7.9894E−01 | 8.1227E−01 | 4.1943E−04 | −2.0506E−03 | −1.3061E−03 |
| A18 = | — | — | — | — | 1.9606E−04 | 1.3184E−04 |
| A20 = | — | — | — | — | −8.1997E−06 | −5.7789E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.93 | T23/BL | 0.89 |
| Fno | 2.42 | ΣAT/(T23 + T56) | 1.27 |
| HFOV [deg.] | 22.9 | TD/BL | 5.54 |
| V2 + V3 + V4 | 64.9 | TL/f | 0.91 |
| V32 | 3 | f/R12 | −0.18 |
| V24 | 2 | |f1/f2| | 0.47 |
| CT1/(CT2 + CT3 + CT4 + CT5) | 0.77 | |f1/f3| | 0.04 |
| CT1/CT6 | 1.87 | |f1/f4| | 0.21 |
| T23/T34 | 1.95 | |f1/f5| | 0.37 |
| T23/T45 | 19.89 | |f1/f6| | 0.34 |
| T23/(T34 + T45) | 1.78 | f2/f3 | 0.09 |

11th Embodiment

Figure 21:
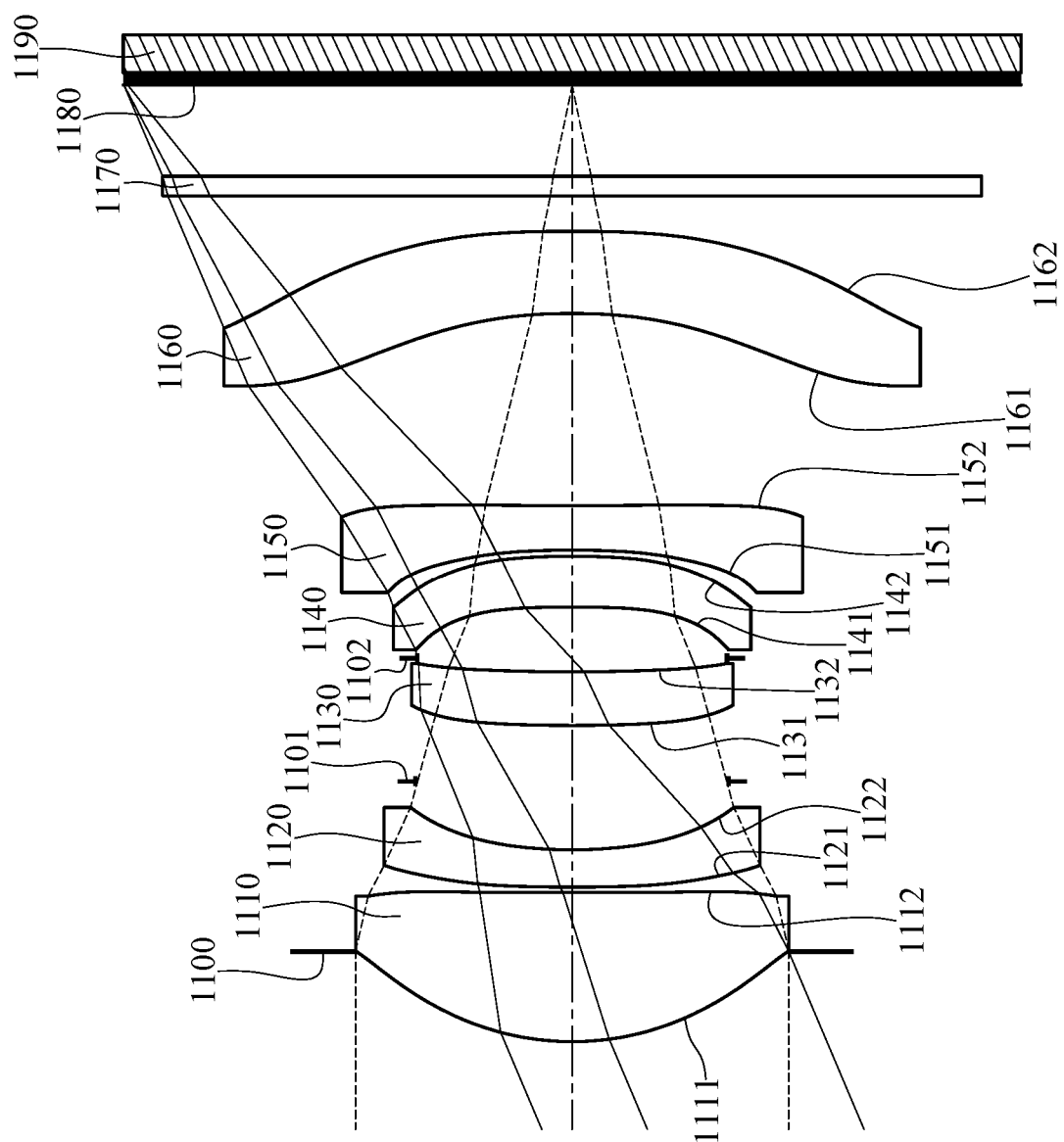
FIG. 21 is a schematic view of an image capturing unit according to the 11th embodiment of the present disclosure.
Figure 22:
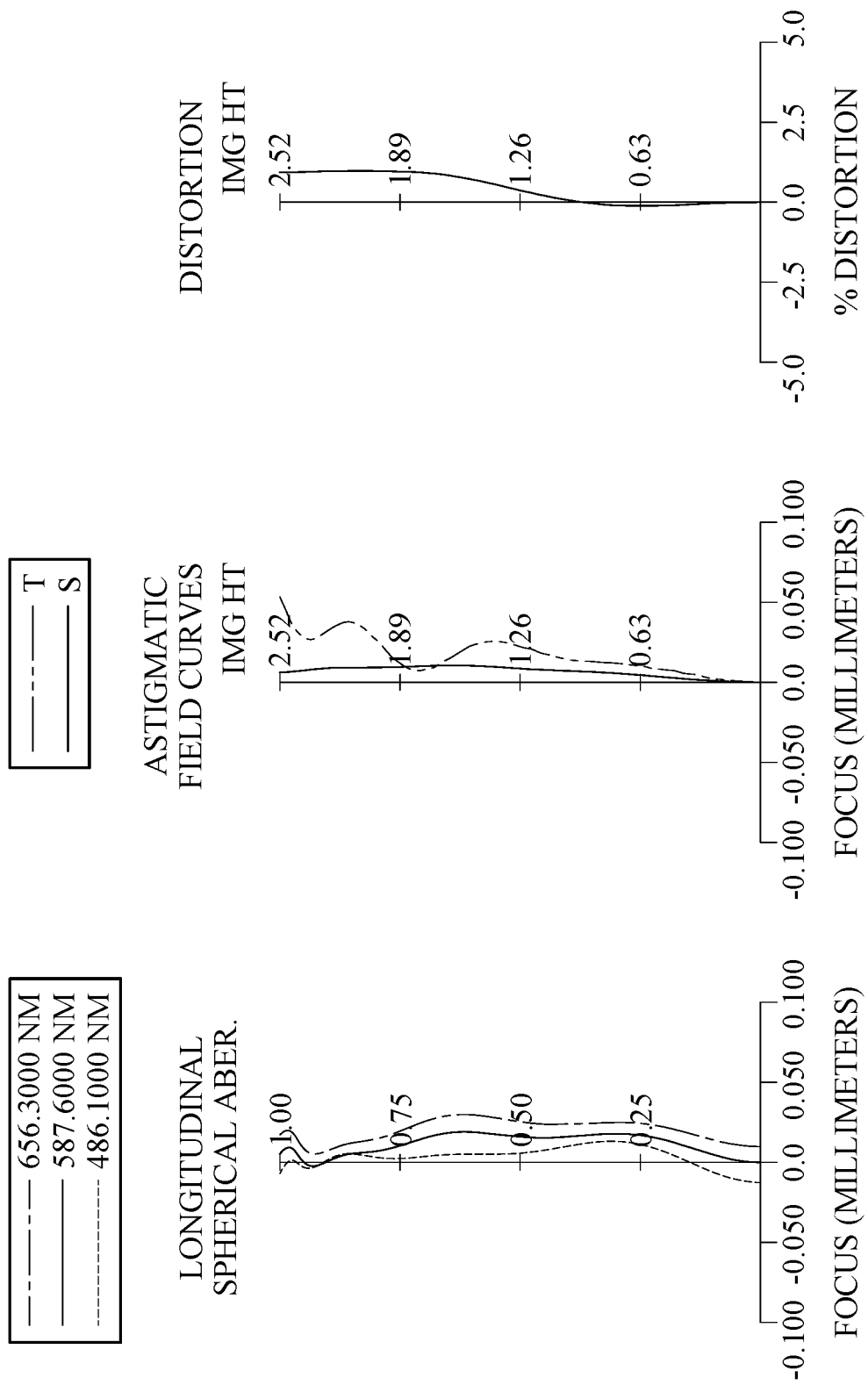
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging optical lens assembly (its reference numeral is omitted) of the present disclosure and an image sensor 1190. The imaging optical lens assembly includes, in order from an object side to an image side, an aperture stop 1100, a first lens element 1110, a second lens element 1120, a stop 1101, a third lens element 1130, a stop 1102, a fourth lens element 1140, a fifth lens element 1150, a sixth lens element 1160, an IR-cut filter 1170 and an image surface 1180. The imaging optical lens assembly includes six lens elements (1110, 1120, 1130, 1140, 1150 and 1160) with no additional lens element disposed between each of the adjacent six lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric.

The fourth lens element 1140 with positive refractive power has an object-side surface 1141 being concave in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being concave in a paraxial region thereof and an image-side surface 1152 being concave in a paraxial region thereof. The fifth lens element 1150 is made of plastic material and has the object-side surface 1151 and the image-side surface 1152 being both aspheric. The image-side surface 1152 of the fifth lens element 1150 has at least one inflection point. The image-side surface 1152 of the fifth lens element 1150 has at least one critical point in an off-axis region thereof.

The sixth lens element 1160 with negative refractive power has an object-side surface 1161 being concave in a paraxial region thereof and an image-side surface 1162 being convex in a paraxial region thereof. The sixth lens element 1160 is made of plastic material and has the object-side surface 1161 and the image-side surface 1162 being both aspheric. The object-side surface 1161 of the sixth lens element 1160 has at least one inflection point. The image-side surface 1162 of the sixth lens element 1160 has at least one inflection point.

The IR-cut filter 1170 is made of glass material and located between the sixth lens element 1160 and the image surface 1180, and will not affect the focal length of the imaging optical lens assembly. The image sensor 1190 is disposed on or near the image surface 1180 of the imaging optical lens assembly.

The detailed optical data of the 11th embodiment are shown in Table 21 and the aspheric surface data are shown in Table 22 below.

TABLE 21

11th Embodiment
f = 5.89 mm, Fno = 2.42, HFOV = 22.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.507 | | | | |
| 2 | Lens 1 | 1.549 | (ASP) | 0.840 | Plastic | 1.545 | 56.1 | 2.89 |
| 3 | | 71.501 | (ASP) | 0.030 | | | | |
| 4 | Lens 2 | 9.880 | (ASP) | 0.210 | Plastic | 1.660 | 20.4 | −5.98 |
| 5 | | 2.795 | (ASP) | 0.386 | | | | |
| 6 | Stop | Plano | | 0.314 | | | | |
| 7 | Lens 3 | 10.432 | (ASP) | 0.301 | Plastic | 1.614 | 26.0 | −160.36 |
| 8 | | 9.328 | (ASP) | 0.077 | | | | |
| 9 | Stop | Plano | | 0.288 | | | | |
| 10 | Lens 4 | −9.120 | (ASP) | 0.289 | Plastic | 1.669 | 19.5 | 15.22 |

TABLE 21-continued

11th Embodiment
f = 5.89 mm, Fno = 2.42, HFOV = 22.9 deg.

| Surface # | | Curvature Radius | | Thickness | Material | Index | Abbe # | Focal Length |
|---|---|---|---|---|---|---|---|---|
| 11 | | −4.872 | (ASP) | 0.035 | | | | |
| 12 | Lens 5 | −5.471 | (ASP) | 0.250 | Plastic | 1.544 | 56.0 | −7.68 |
| 13 | | 17.982 | (ASP) | 1.082 | | | | |
| 14 | Lens 6 | −3.287 | (ASP) | 0.462 | Plastic | 1.534 | 55.9 | −8.94 |
| 15 | | −11.088 | (ASP) | 0.200 | | | | |
| 16 | IR-cut Filter | Plano | | 0.110 | Glass | 1.517 | 64.2 | — |
| 17 | | Plano | | 0.513 | | | | |
| 18 | Image | Plano | | 0.000 | | | | |

Note:
Reference wavelength is 587.6 nm (d-line).
An effective radius of the stop 1101 (Surface 6) is 0.880 mm.
An effective radius of the stop 1102 (Surface 9) is 0.870 mm.

TABLE 22

Aspheric Coefficients

| Surface # | 2 | 3 | 4 | 5 | 7 | 8 |
|---|---|---|---|---|---|---|
| k = | −6.2070E−01 | 0.0000E+00 | 2.3290E+01 | −3.1737E+01 | −8.9288E+01 | 0.0000E+00 |
| A4 = | 3.5918E−03 | −1.4077E−01 | −8.2673E−02 | 2.4431E−01 | 3.1018E−02 | −6.8673E−02 |
| A6 = | 4.6267E−02 | 8.5100E−01 | 8.5760E−01 | −5.0513E−02 | 1.4772E−01 | 1.2020E−01 |
| A8 = | −1.1701E−01 | −1.9773E+00 | −1.8728E+00 | 1.0760E−01 | −1.0873E−01 | 1.1252E−01 |
| A10 = | 1.7101E−01 | 2.3414E+00 | 1.9007E+00 | −4.5494E−01 | 1.2863E−01 | −3.4258E−01 |
| A12 = | −1.4053E−01 | −1.5552E+00 | −9.3992E−01 | 6.0794E−01 | −1.4336E−01 | 2.8714E−01 |
| A14 = | 5.7833E−02 | 5.5409E−01 | 1.8683E−01 | −2.4496E−01 | 9.5200E−02 | −8.3394E−02 |
| A16 = | −1.0095E−02 | −8.3086E−02 | — | — | — | — |

| Surface # | 10 | 11 | 12 | 13 | 14 | 15 |
|---|---|---|---|---|---|---|
| k = | 0.0000E+00 | −3.3127E+01 | 5.8965E+00 | 0.0000E+00 | −2.0989E+00 | −3.7828E+01 |
| A4 = | −2.3199E−01 | −6.4691E−02 | 1.6394E−02 | −9.2587E−02 | −1.1194E−01 | −1.3282E−01 |
| A6 = | −4.3897E−01 | −1.7215E+00 | −1.5316E+00 | 1.7245E−01 | 1.1851E−01 | 1.1145E−01 |
| A8 = | 1.4710E+00 | 6.4980E+00 | 6.1309E+00 | −2.0705E−01 | −6.4047E−02 | −7.3690E−02 |
| A10 = | −3.0568E+00 | −1.2155E+01 | −1.1394E+01 | 1.4865E−01 | 1.5787E−02 | 3.6708E−02 |
| A12 = | 4.2014E+00 | 1.2670E+01 | 1.1248E+01 | −6.9154E−02 | 4.3383E−03 | −1.3888E−02 |
| A14 = | −3.9370E+00 | −7.1951E+00 | −5.7812E+00 | 1.7634E−02 | −4.4019E−03 | 3.7795E−03 |
| A16 = | 1.6818E+00 | 1.7622E+00 | 1.2050E+00 | −1.8744E−03 | 1.3262E−03 | −6.6638E−04 |
| A18 = | — | — | — | — | −1.8624E−04 | 6.6847E−05 |
| A20 = | — | — | — | — | 1.0338E−05 | −2.9005E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

11th Embodiment

| | | | |
|---|---|---|---|
| f [mm] | 5.89 | T23/BL | 0.85 |
| Fno | 2.42 | ΣAT/(T23 + T56) | 1.24 |
| HFOV [deg.] | 22.9 | TD/BL | 5.54 |
| V2 + V3 + V4 | 65.8 | TL/f | 0.91 |
| V32 | 3 | f/R12 | −0.53 |
| V24 | 2 | |f1/f2| | 0.48 |
| CT1/(CT2 + CT3 + CT4 + CT5) | 0.80 | |f1/f3| | 0.02 |
| CT1/CT6 | 1.82 | |f1/f4| | 0.19 |
| T23/T34 | 1.92 | |f1/f5| | 0.38 |
| T23/T45 | 20.00 | |f1/f6| | 0.32 |
| T23/(T34 + T45) | 1.75 | f2/f3 | 0.04 |

12th Embodiment

Figure 23:
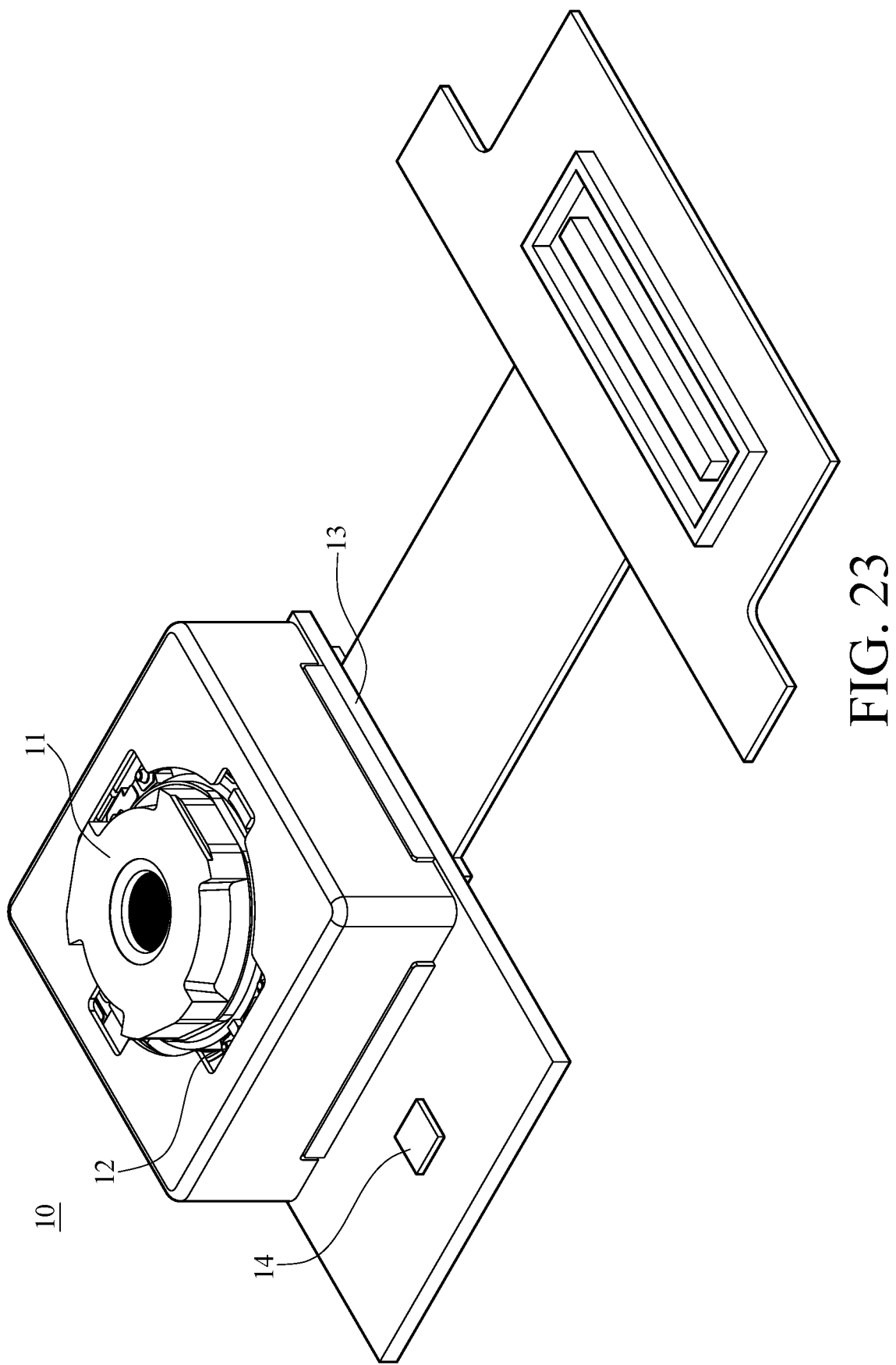
FIG. 23 is a perspective view of an image capturing unit according to the 12th embodiment of the present disclosure.

FIG. 23 is a perspective view of an image capturing unit according to the 12th embodiment of the present disclosure. In this embodiment, an image capturing unit 10 is a camera module including a lens unit 11, a driving device 12, an image sensor 13 and an image stabilizer 14. The lens unit 11 includes the imaging optical lens assembly disclosed in the 1st embodiment, a barrel and a holder member (their reference numerals are omitted) for holding the imaging optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

13th Embodiment

Figure 24:
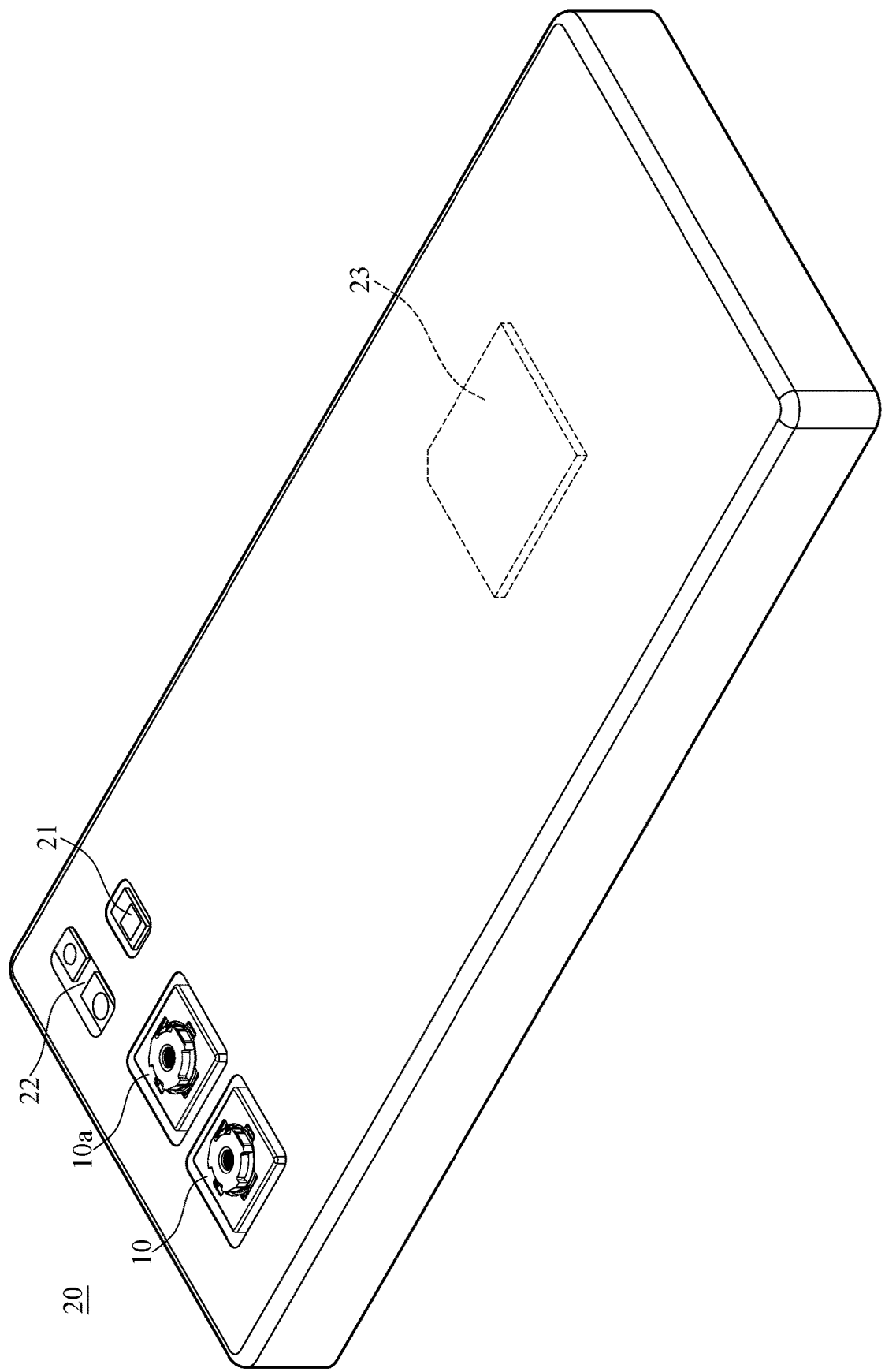
FIG. 24 is one perspective view of an electronic device according to the 13th embodiment of the present disclosure.
Figure 25:
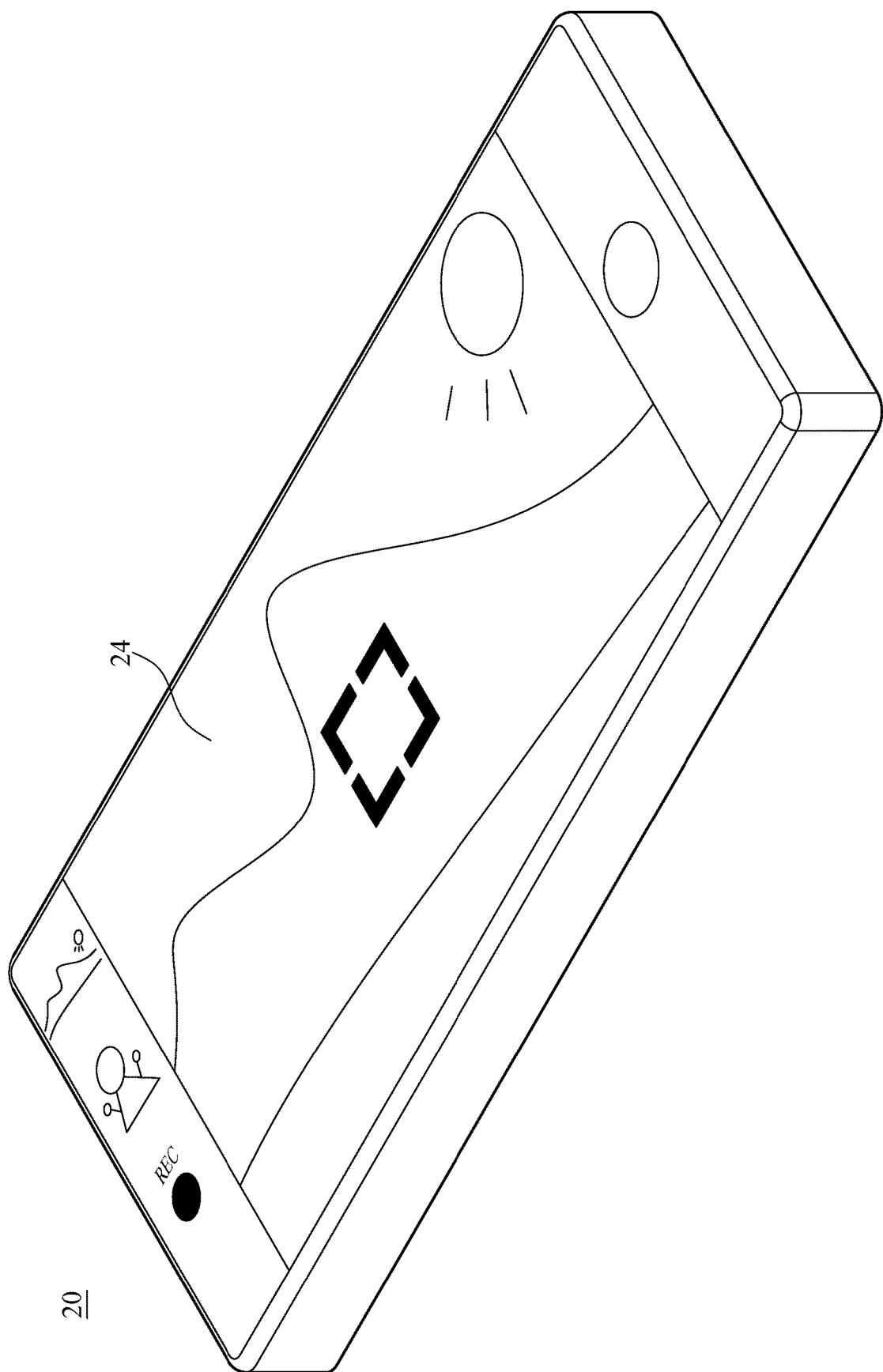
FIG. 25 is another perspective view of the electronic device in FIG. 24.
Figure 26:
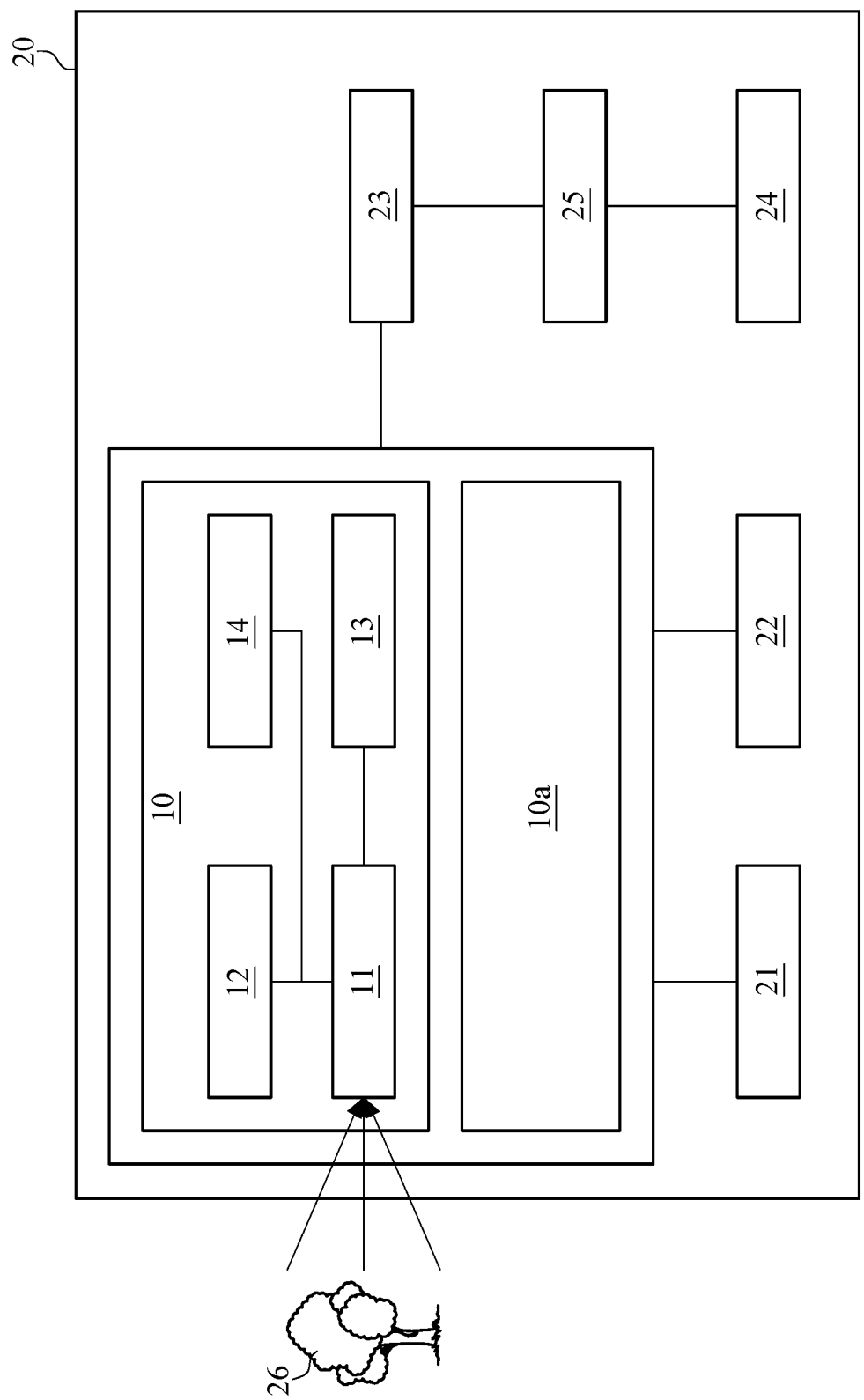
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24.

In this embodiment, an electronic device 20 is a smartphone including the image capturing unit 10 disclosed in the 12th embodiment, an image capturing unit 10a, a flash module 21, a focus assist module 22, an image signal processor 23, a user interface 24 and an image software processor 25. The image capturing unit 10 and the image capturing unit 10a face the same direction, and each of the image capturing units 10 and 10a has a single focal point. Furthermore, the image capturing unit 10a has a configuration similar to that of the image capturing unit 10. In detail, the image capturing unit 10a includes a lens unit, a driving device, an image sensor and an image stabilizer, and the lens unit includes a lens assembly, a barrel and a holder member for holding the lens assembly.

In this embodiment, the image capturing units 10 and 10a have different fields of view (e.g., the image capturing unit 10 is a telephoto image capturing unit and the image capturing unit 10a is a standard image capturing unit), such that the electronic device 20 has various magnification ratios so as to meet the requirement of optical zoom functionality. In this embodiment, the electronic device 20 includes multiple image capturing units 10 and 10a, but the present disclosure is not limited to the number and arrangement of image capturing units.

When a user captures images of an object 26, the light rays converge in the image capturing unit 10 or the image capturing unit 10a to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising six lens elements, the six lens elements being, in order from an object side to an image side, a first lens element, a second lens element, a third lens element, a fourth lens element, a fifth lens element and a sixth lens element;
   wherein the first lens element with positive refractive power has an object-side surface being convex in a paraxial region thereof, and there is an air gap in a paraxial region between each of all adjacent lens elements of the imaging optical lens assembly;
   wherein a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, an axial distance between the third lens element and the fourth lens element is T34, an axial distance between the fourth lens element and the fifth lens element is T45, an axial distance between the object-side surface of the first lens element and an image-side surface of the sixth lens element is TD, an axial distance between the image-side surface of the sixth lens element and an image surface is BL, a focal length of the imaging optical lens assembly is f, a curvature radius of the image-side surface of the sixth lens element is R12, and the following conditions are satisfied:

$1.0 \leq CT1/(CT2+CT3+CT4+CT5)$;

$0.80 < T23/T34$;

$1.20 < T23/T45$;

$1.20 < TD/BL < 50$; and $f/R12 \leq 0$.

2. The imaging optical lens assembly of claim 1, wherein the central thickness of the first lens element is CT1, the central thickness of the second lens element is CT2, the central thickness of the third lens element is CT3, the central thickness of the fourth lens element is CT4, the central thickness of the fifth lens element is CT5, and the following condition is satisfied:

1.10<CT1/(CT2+CT3+CT4+CT5)<3.0.

3. The imaging optical lens assembly of claim 1, wherein the axial distance between the second lens element and the third lens element is T23, the axial distance between the fourth lens element and the fifth lens element is T45, and the following condition is satisfied:

2.0<T23/T45.

4. The imaging optical lens assembly of claim 1, wherein an Abbe number of the second lens element is V2, an Abbe number of the third lens element is V3, an Abbe number of the fourth lens element is V4, and the following condition is satisfied:

V2+V3+V4<80.

5. The imaging optical lens assembly of claim 1, wherein the axial distance between the object-side surface of the first lens element and the image-side surface of the sixth lens element is TD, the axial distance between the image-side surface of the sixth lens element and the image surface is BL, and the following condition is satisfied:

2.0<TD/BL<20.

6. The imaging optical lens assembly of claim 1, wherein the central thickness of the first lens element is CT1, a central thickness of the sixth lens element is CT6, and the following condition is satisfied:

CT1/CT6<2.0.

7. The imaging optical lens assembly of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

|f1/f2|<1.0;

|f1/f3|<1.0;

|f1/f4|<1.0;

|f1/f5|<1.0; and

|f1/f6|<1.0.

8. The imaging optical lens assembly of claim 1, wherein a sum of axial distances between each of all adjacent lens elements of the imaging optical lens assembly is ΣAT, the axial distance between the second lens element and the third lens element is T23, an axial distance between the fifth lens element and the sixth lens element is T56, and the following condition is satisfied:

ΣAT/(T23+T56)<2.0.

9. The imaging optical lens assembly of claim 1, wherein a focal length of the second lens element is f2, a focal length of the fifth lens element is f5, and the following condition is satisfied:

f5/f2<1.20.

10. The imaging optical lens assembly of claim 1, wherein a number of lens elements having an Abbe number smaller than 32 in the imaging optical lens assembly is V32, and the following condition is satisfied:

3≤V32.

11. The imaging optical lens assembly of claim 1, wherein the fifth lens element has an object-side surface being concave.

12. The imaging optical lens assembly of claim 1, wherein at least three lens elements of the imaging optical lens assembly are made of plastic material, at least one of the fifth lens element and the sixth lens element has at least one lens surface having at least one inflection point, an axial distance between the object-side surface of the first lens element and the image surface is TL, the focal length of the imaging optical lens assembly is f, and the following condition is satisfied:

0.50<TL/f<1.05.

13. The imaging optical lens assembly of claim 1, wherein the focal length of the imaging optical lens assembly is f, the curvature radius of the image-side surface of the sixth lens element is R12, and the following condition is satisfied:

f/R12<−0.90.

14. The imaging optical lens assembly of claim 1, wherein the axial distance between the second lens element and the third lens element is T23, the axial distance between the image-side surface of the sixth lens element and the image surface is BL, and the following condition is satisfied:

0.75<T23/BL.

15. The imaging optical lens assembly of claim 1, wherein at least one of the fifth lens element and the sixth lens element has at least one lens surface having at least one critical point in an off-axis region thereof.

16. The imaging optical lens assembly of claim 1, wherein a focal length of the second lens element is f2, a focal length of the third lens element is f3, and the following condition is satisfied:

0.50<f2/f3<2.0.

17. An image capturing unit, comprising:
the imaging optical lens assembly of claim 1; and
an image sensor disposed on the image surface of the imaging optical lens assembly.

18. An electronic device, comprising:
the image capturing unit of claim 17.

19. An imaging optical lens assembly comprising six lens elements, the six lens elements being, in order from an object side to an image side, a first lens element, a second lens element, a third lens element, a fourth lens element, a fifth lens element and a sixth lens element;
wherein the first lens element with positive refractive power has an object-side surface being convex in a paraxial region thereof, and the fifth lens element has an object-side surface being concave in a paraxial region thereof;
wherein a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, an axial distance between the third lens element and the fourth lens element is T34, an axial distance between the fourth lens element and the fifth lens element is T45, an axial distance between the object-side surface of the first lens element and an image-side surface of the sixth lens element is TD, an axial distance between the image-side surface of the sixth lens element and an image surface is BL, a focal length of the imaging optical lens assembly is f, a curvature radius of the image-side surface of the sixth lens element is R12, and the following conditions are satisfied:

0.70<CT1/(CT2+CT3+CT4+CT5);

1.20<T23/(T34+T45)<20;

3.0<TD/BL<50; and f/R12≤0.

20. The imaging optical lens assembly of claim 19, wherein the central thickness of the first lens element is CT1, the central thickness of the second lens element is CT2, the central thickness of the third lens element is CT3, the central thickness of the fourth lens element is CT4, the central thickness of the fifth lens element is CT5, and the following condition is satisfied:

0.85<CT1/(CT2+CT3+CT4+CT5)<5.0.

21. The imaging optical lens assembly of claim 19, wherein an Abbe number of the second lens element is V2, an Abbe number of the third lens element is V3, an Abbe number of the fourth lens element is V4, and the following condition is satisfied:

V2+V3+V4<80.

22. The imaging optical lens assembly of claim 19, wherein the focal length of the imaging optical lens assembly is f, the curvature radius of the image-side surface of the sixth lens element is R12, and the following condition is satisfied:

f/R12<−0.90.

23. The imaging optical lens assembly of claim 19, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

|f1/f2|<1.0;

|f1/f3|<1.0;

|f1/f4|<1.0;

|f1/f5|<1.0; and

|f1/f6|<1.0.

24. The imaging optical lens assembly of claim 19, wherein a number of lens elements having an Abbe number smaller than 32 in the imaging optical lens assembly is V32, and the following condition is satisfied:

3≤V32.

25. The imaging optical lens assembly of claim 19, wherein the axial distance between the second lens element and the third lens element is T23, the axial distance between the image-side surface of the sixth lens element and the image surface is BL, and the following condition is satisfied:

0.75<T23/BL.

26. The imaging optical lens assembly of claim 19, wherein a focal length of the second lens element is f2, a focal length of the third lens element is f3, and the following condition is satisfied:

0.50<f2/f3<2.0.

27. The imaging optical lens assembly of claim 19, wherein at least one of the fifth lens element and the sixth lens element has at least one lens surface having at least one inflection point, an axial distance between the object-side surface of the first lens element and the image surface is TL, the focal length of the imaging optical lens assembly is f, and the following condition is satisfied:

0.50<TL/f<1.05.

28. The imaging optical lens assembly of claim 19, wherein at least one of the fifth lens element and the sixth lens element has at least one lens surface having at least one critical point in an off-axis region thereof.

29. An image capturing unit, comprising:
the imaging optical lens assembly of claim 19; and
an image sensor disposed on the image surface of the imaging optical lens assembly.

30. An electronic device, comprising:
the image capturing unit of claim 29.

* * * * *